US012689951B2

(12) United States Patent
    Hwang

(10) Patent No.:    US 12,689,951 B2
(45) Date of Patent:        Jul. 21, 2026

---

(54) METHOD AND DEVICE FOR PERFORMING SECONDARY NODE CHANGE IN WIRELESS COMMUNICATION SYSTEM

(71) Applicant: Samsung Electronics Co., Ltd.,
        Suwon-si (KR)

(72) Inventor:    June Hwang, Suwon-si (KR)

(73) Assignee: Samsung Electronics Co., Ltd.,
        Suwon-si (KR)

( * ) Notice:    Subject to any disclaimer, the term of this patent is extended or adjusted under 35 U.S.C. 154(b) by 206 days.

(21) Appl. No.:    18/281,210

(22) PCT Filed:    Feb. 25, 2022

(86) PCT No.:    PCT/KR2022/002826
        § 371 (c)(1),
        (2) Date:    Sep. 8, 2023

(87) PCT Pub. No.:    WO2022/191483
        PCT Pub. Date: Sep. 15, 2022

(65)            Prior Publication Data
        US 2024/0172057 A1        May 23, 2024

(30)        Foreign Application Priority Data
        Mar. 9, 2021    (KR) ........................ 10-2021-0031023

(51) Int. Cl.
        *H04W 36/00*            (2009.01)
(52) U.S. Cl.
        CPC ...    *H04W 36/0069* (2018.08); *H04W 36/0061*
                    (2013.01); *H04W 36/00835* (2018.08)
(58) Field of Classification Search
        CPC ........... H04W 36/362; H04W 36/0061; H04W
                    36/00835; H04W 36/185; H04W 36/06;
                            (Continued)

(56)            References Cited

U.S. PATENT DOCUMENTS

2015/0078335 A1    3/2015    Sivanesan et al.
        2015/0326371 A1    11/2015    Baek et al.
                        (Continued)

FOREIGN PATENT DOCUMENTS

CN        107666727 A    2/2018
        WO    2019/179315 A1    9/2019
                        (Continued)

OTHER PUBLICATIONS

3GPP; TSGRAN; Evolved Universal Terrestrial Radio Access (E-UTRA) and NR; Multi-connectivity; Stage 2 (Release 16); V16.4.0; Dec. 2020.
                        (Continued)

*Primary Examiner* — Mohamed A Kamara
(74) *Attorney, Agent, or Firm* — Jefferson IP Law, LLP

(57)            ABSTRACT

A method and a device for performing a secondary node change in a wireless communication system are disclosed. A method by which a multi-access master node (MN) performs a secondary node (SN) change in a wireless communication system may comprise the steps of: receiving, from a source secondary node (S-SN), an SN change request message including conditional cell change information indicating the maximum number of one or more candidate cells that can be serviced by one or more target secondary nodes (T-SN); transmitting, to the one or more target secondary nodes, an SN additional request message on the basis of the conditional cell change information; receiving, from the one or more target secondary nodes, an SN additional request ACK message including radio resource control (RRC) configuration information in response to the SN additional request message; and transmitting an RRC reconfiguration message to a user terminal on the basis of the RRC configuration information.

14 Claims, 13 Drawing Sheets

(58) Field of Classification Search
CPC . H04W 36/34; H04W 36/322; H04W 88/085;
H04W 36/0069; H04W 36/0072; H04W
36/08; H04W 36/00695; H04W 76/27;
H04W 76/34
See application file for complete search history.

(56) References Cited

U.S. PATENT DOCUMENTS

| | | | |
|---|---|---|---|
| 2021/0014865 A1 | 1/2021 | Zheng et al. | |
| 2021/0258843 A1* | 8/2021 | Awada | H04W 48/08 |
| 2022/0279435 A1 | 9/2022 | Cheng et al. | |
| 2023/0111427 A1* | 4/2023 | Zhang | H04W 16/26 370/331 |
| 2023/0171652 A1* | 6/2023 | Zhang | H04W 36/362 370/331 |
| 2023/0300691 A1* | 9/2023 | Eklöf | H04W 36/0061 370/331 |
| 2023/0370910 A1* | 11/2023 | Sabouri-Sichani | H04W 36/00835 |
| 2024/0040442 A1* | 2/2024 | Kordybach | H04W 36/008357 |

FOREIGN PATENT DOCUMENTS

| | | | |
|---|---|---|---|
| WO | 2019/194729 A1 | 10/2019 | |
| WO | 2021/026871 A1 | 2/2021 | |

OTHER PUBLICATIONS

Huawei, "Summary of Offline Discussion on MRDC2-PSCell_Change_Addition," 3GPP TSG-RAN WG3 #110-e, R3-206893, Jun. 1-11, 2020.
Ericsson, "Support of conditional PSCell change/addition," 3GPP TSG-RAN WG3 Meeting #111-e, R3-210744, Jan. 25-Feb. 5, 2021.
CATT, "Discussion on SCG change procedure," 3GPP TSG-RAN WG3 Meeting #96, R3-171592, Hangzhou, P. R. China, May 15-19, 2017.
International Search Report and written opinion dated Feb. 25, 2022, issued in international application No. PCT/KR2022/002826.
Huawei; Summary of Offline Discussion on MRDC2-PSCell_Change_Addition; 3GPP TSG-RAN WG3 #110-e; R3-207004; XP052255934; Online; Jun. 1-11, 2020; Nov. 17, 2020.
Huawei; Discussion on Support of conditional PSCell change/addition; 3GPP TSG-RAN WG3 Meeting #110-e; R3-206344; XP051945810; E-meeting; Nov. 2-12, 2020; Oct. 23, 2020.
Extended European Search Report dated Jul. 11, 2024; European Appln. No. 22767379.5-1215 / 4301040 PCT/KR2022002826.
Korean Office Action with English translation dated Feb. 18, 2026; Korean Appln. No. 10-2021-0031023.
Ericsson, Procedure for secondary node change, Tdoc R2-1700920, 3GPP TSG-RAN WG2 #97, Feb. 4, 2017, Athens, Greece.
Chinese Office Action dated May 22, 2026, issued in Chinese Patent Application No. 20228002048.6.

* cited by examiner

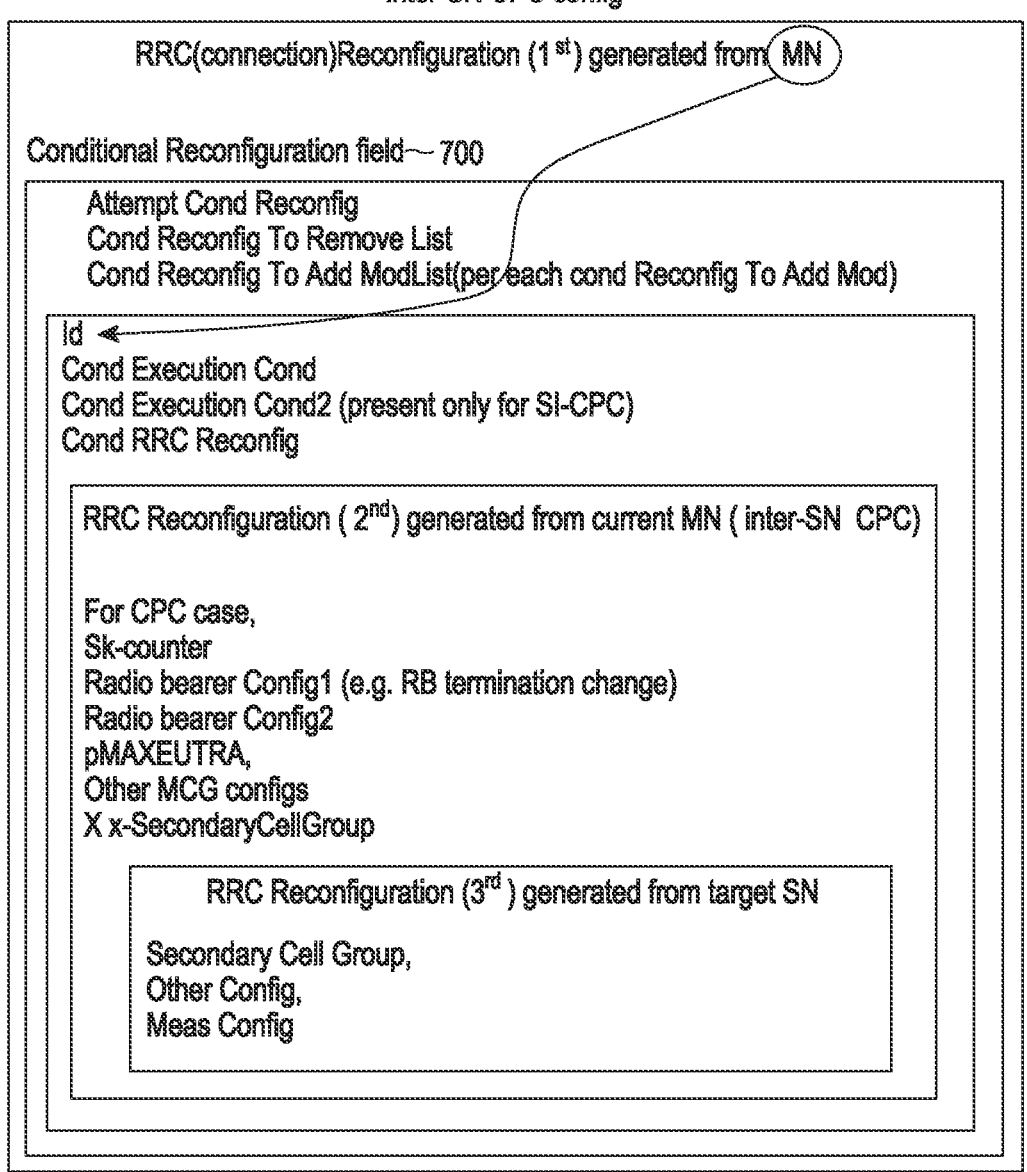

<Inter-SN CPC config>

RRC(connection)Reconfiguration (1ˢᵗ) generated from MN

Conditional Reconfiguration field— 700

Attempt Cond Reconfig
Cond Reconfig To Remove List
Cond Reconfig To Add ModList(per each cond Reconfig To Add Mod)

Id
Cond Execution Cond
Cond Execution Cond2 (present only for SI-CPC)
Cond RRC Reconfig RRC Reconfiguration ( 2ⁿᵈ) generated from current MN ( inter-SN  CPC)

For CPC case,
Sk-counter
Radio bearer Config1 (e.g. RB termination change)
Radio bearer Config2
pMAXEUTRA,
Other MCG configs
X x-SecondaryCellGroup RRC Reconfiguration (3ʳᵈ ) generated from target SN Secondary Cell Group,
Other Config,
Meas Config

FIG. 7A

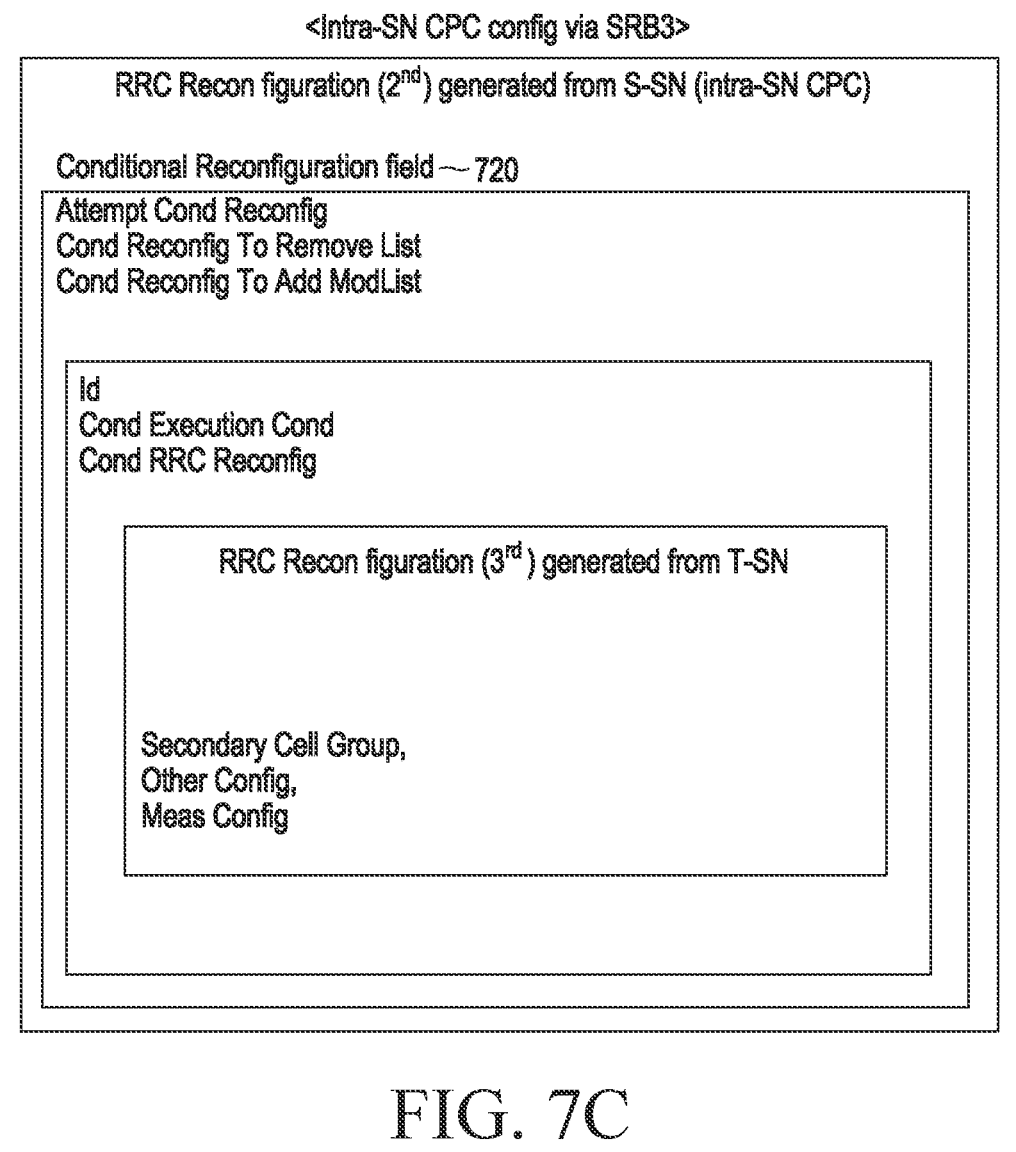

<Intra-SN CPC config via SRB3>

RRC Recon figuration (2nd) generated from S-SN (intra-SN CPC)

Conditional Reconfiguration field ~ 720

Attempt Cond Reconfig
Cond Reconfig To Remove List
Cond Reconfig To Add ModList

Id
Cond Execution Cond
Cond RRC Reconfig

RRC Recon figuration (3rd) generated from T-SN

Secondary Cell Group,
Other Config,
Meas Config

FIG. 7C

METHOD AND DEVICE FOR PERFORMING SECONDARY NODE CHANGE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2022/002826, filed on Feb. 25, 2022, which is based on and claims priority to Korean patent application number 10-2021-0031023, filed on Mar. 9, 2021 in the Korean Intellectual Property Office, the disclosure of which is incorporated by reference herein in its entirety.

TECHNICAL FIELD

Various embodiments of the disclosure relate to a method and device for performing a secondary node change in a wireless communication system.

BACKGROUND ART

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FOAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

DETAILED DESCRIPTION OF THE INVENTION

Technical Problem

Embodiments of the disclosure may perform negotiation between the MN and the SN so that the total number of pieces of conditional mobility configuration information stored in the UE and operated from the network does not exceed the capability of the UE.

Embodiments of the disclosure may transfer information about candidates determined in the target secondary node (T-SN) to the source secondary node (S-SN) for candidate configuration information of conditional PSCell addition/change (CPAC) given to the UE.

Embodiments of the disclosure may reduce unnecessary measurement operations that are performed on the UE by matching CPAC-related configuration information given to the UE with measurement information related thereto.

Technical Solution

According to various embodiments, a method for performing a secondary node (SN) change by a master node (MN) of multi-connectivity in a wireless communication system may comprise receiving, from a source secondary node (S-SN), an SN change request (SN change required) message including conditional cell change information indicating a maximum number of one or more candidate cells that is serviceable by at least one target secondary node (T-SN), transmitting an SN addition request message to the at least one target secondary node based on the conditional cell change information, receiving an SN addition request acknowledge message including radio resource control (RRC) configuration information from the at least one target secondary node in response to the SN addition request message, and transmitting an RRC reconfiguration message to a user equipment (UE) based on the RRC configuration information.

According to various embodiments, a method for performing a secondary node (SN) change by a master node (MN) of multi-connectivity in a wireless communication system may comprise transmitting, to at least one target secondary node (T-SN), an SN addition request message including conditional cell change information indicating a maximum number of one or more candidate cells that is serviceable by the at least one target secondary node, receiving an SN addition request acknowledge message including radio resource control (RRC) configuration information from the at least one target secondary node in response to the SN addition request message, and transmitting an RRC reconfiguration message to a user equipment (UE) based on the RRC configuration information.

According to various embodiments, a method for performing a secondary node (SN) change by a master node (MN) of multi-connectivity in a wireless communication system may comprise transmitting, to a source secondary node (S-SN), an SN modification request message including candidate cell information indicating one or more candidate cells admitted by at least one target secondary node (T-SN), receiving, from the source secondary node, measurement configuration information updated based on the candidate cell information, and transmitting an RRC reconfiguration message including the updated measurement configuration information to a UE.

According to various embodiments, a device of a master node (MN) performing a secondary node (SN) change of multi-connectivity in a wireless communication system may comprise a transceiver and a controller. The controller may be configured to receive, from a source secondary node (S-SN), an SN change request (SN change required) message including conditional cell change information indicating a maximum number of one or more candidate cells that is serviceable by at least one target secondary node (T-SN), transmit an SN addition request message to the at least one target secondary node based on the conditional cell change information, receive an SN addition request acknowledge message including radio resource control (RRC) configuration information from the at least one target secondary node in response to the SN addition request message, and transmit an RRC reconfiguration message to a user equipment (UE) based on the RRC configuration information.

According to various embodiments, a device of a master node (MN) performing a secondary node (SN) change of multi-connectivity in a wireless communication system may comprise a transceiver and a controller. The controller may be configured to transmit, to at least one target secondary node (T-SN), an SN addition request message including conditional cell change information indicating a maximum number of one or more candidate cells that is serviceable by the at least one target secondary node, receive an SN addition request acknowledge message including radio resource control (RRC) configuration information from the at least one target secondary node in response to the SN addition request message, and transmit an RRC reconfiguration message to a user equipment (UE) based on the RRC configuration information.

According to various embodiments, a device of a master node (MN) performing a secondary node (SN) change of multi-connectivity in a wireless communication system may comprise a transceiver and a controller. The controller may be configured to transmit, to a source secondary node (S-SN), an SN modification request message including candidate cell information indicating one or more candidate cells admitted by at least one target secondary node (T-SN), receive, from the source secondary node, measurement configuration information updated based on the candidate cell information, and transmit an RRC reconfiguration message including the updated measurement configuration information to a UE.

In an embodiment of the disclosure, a method for managing a UE's conditional reconfiguration by a master node (MN) in a wireless communication system may comprise receiving, from a source secondary node, an SN change request message related to at least one target secondary node, transmitting, to the target secondary node, information indicating a number allowed for the target secondary node (SN) among a number of pieces of conditional reconfiguration information operable by the UE, receiving conditional reconfiguration information about at least one candidate cell selected in the allowed number from the target secondary node, and transmitting conditional reconfiguration information about the at least one candidate cell to the UE.

In an embodiment, the conditional reconfiguration information about the at least one candidate cell may include conditional reconfiguration information about at least one candidate cell succeeding on candidate admission in the target secondary node.

In an embodiment of the disclosure, a method for managing a conditional reconfiguration by a UE in a secondary node (SN) in a wireless communication system may comprise receiving an SN addition request message including an allowed number of conditional reconfiguration information operable by the UE from a master node (MN), determining a plurality of candidate cells in the allowed number, and transmitting conditional reconfiguration information about the determined candidate cells to the master node.

Advantageous Effects

According to various embodiments, in the case of dual connection (dual connectivity or DC), the total number of pieces of conditional reconfiguration information stored in the UE and operated from the network may be maintained not to exceed the UE's processing capacity.

According to various embodiments, it is possible to match configuration information related to conditional mobility given to the UE and measurement information associated therewith and reduce unnecessary measurement operations by providing information about candidate cells determined in the T-SN to the S-SN for conditional cell addition or conditional cell change given to the UE.

BRIEF DESCRIPTION OF DRAWINGS

FIGS. 7A, 7B, and 7C illustrate a format of conditional reconfiguration information according to various embodiments;

MODE FOR CARRYING OUT THE INVENTION

Figure 1:
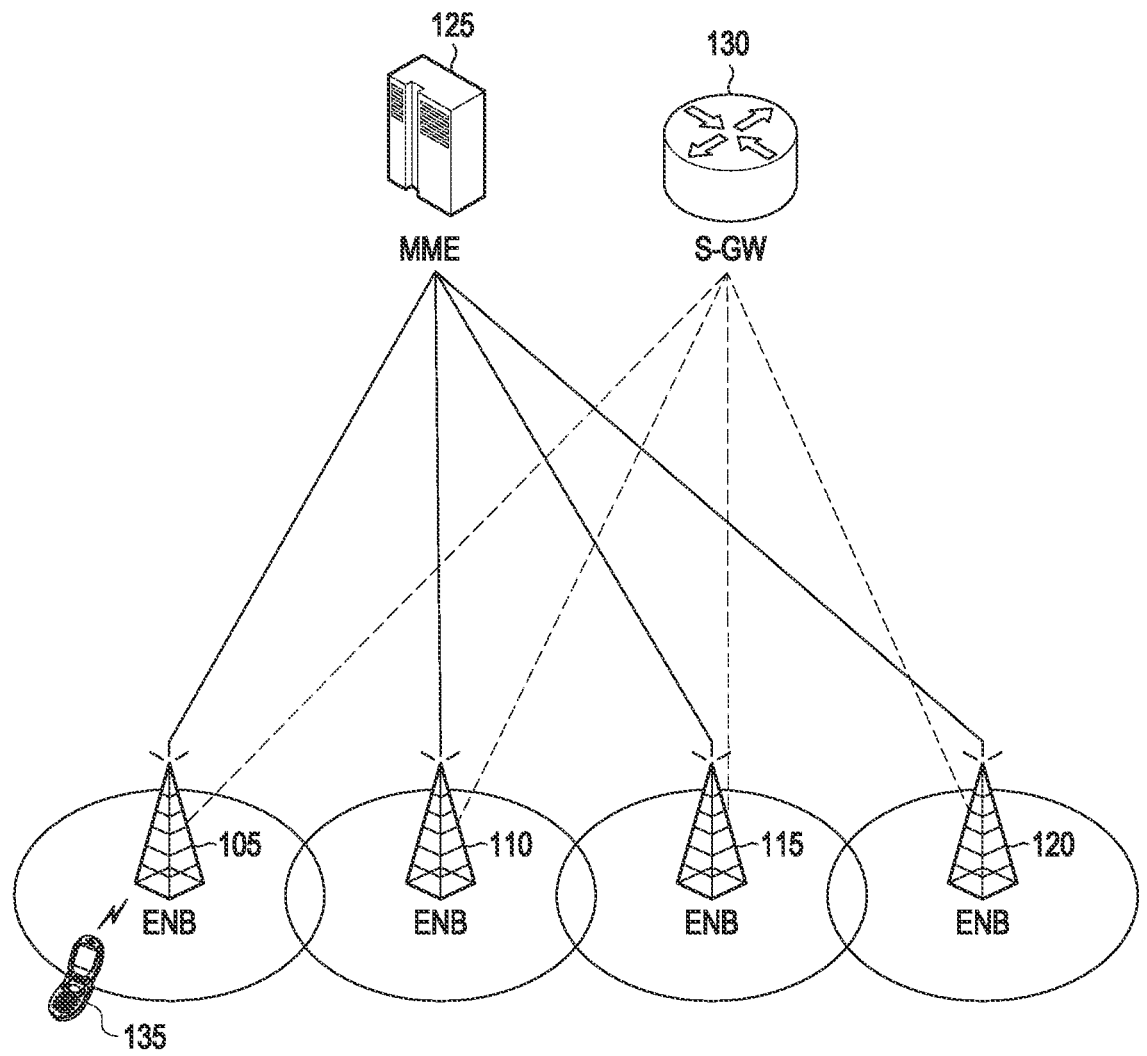
FIG. 1 is a view illustrating a structure of an LTE system according to an embodiment.

Hereinafter, preferred embodiments are described in detail with reference to the accompanying drawings. The same reference denotations may be used to refer to the same or similar elements throughout the specification and the drawings. When making the gist of the present disclosure unclear, the detailed description of known functions or configurations is skipped.

In describing the embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, hereinafter, some of the terms and names defined in the 3rd generation partnership project long term evolution (3GPP LTE) standards may be used. However, the disclosure is not limited by such terms and names and may be likewise applicable to systems conforming to other standards.

FIG. 1 is a view illustrating a structure of an LTE system according to an embodiment.

Referring to FIG. 1, as shown, a radio access network of the long term evolution (LTE) system may include an evolved base stations (evolved node B—hereinafter, ENB, node B, or base station) 105, 110, 115, and 120, a mobility management entity (MME) 125, and a serving gateway (S-GW) 130. A user equipment (hereinafter, "UE" or "terminal") 135 may access an external network through the ENBs 105 to 120 and the S-GW 130.

The ENBs 105 to 120 may correspond to node Bs in the legacy universal mobile telecommunication system (UMTS) system. Each ENB may be connected with the UE 135 through a radio channel and play a more complicated role than the legacy node B. In the LTE system, all user traffic including real-time services, such as voice over IP (VoIP) through the Internet protocol may be served through a shared channel. Accordingly, a device for performing scheduling by collecting status information, such as buffer status, available transmission power status, and channel state of UEs, is required, and the ENBs 105 to 120 may take a role.

One ENB typically may control multiple cells. For example, the LTE system may use, as a radio access technology, orthogonal frequency division multiplexing (OFDM) on a 20 MHz bandwidth in order to implement a transmission speed of 100 Mbps. Further, the system may apply adaptive modulation & coding (AMC) that determines a modulation scheme and a channel coding rate in compliance with the channel state of the UE.

The S-GW 130 is an apparatus providing data bearers and may generate or remove a data bearer under the control of the MME 125. The MME 125 is a device in charge of various control functions as well as the mobility management function for the UE 135, and may be connected to the plurality of ENBs 105 to 120.

Figure 2:
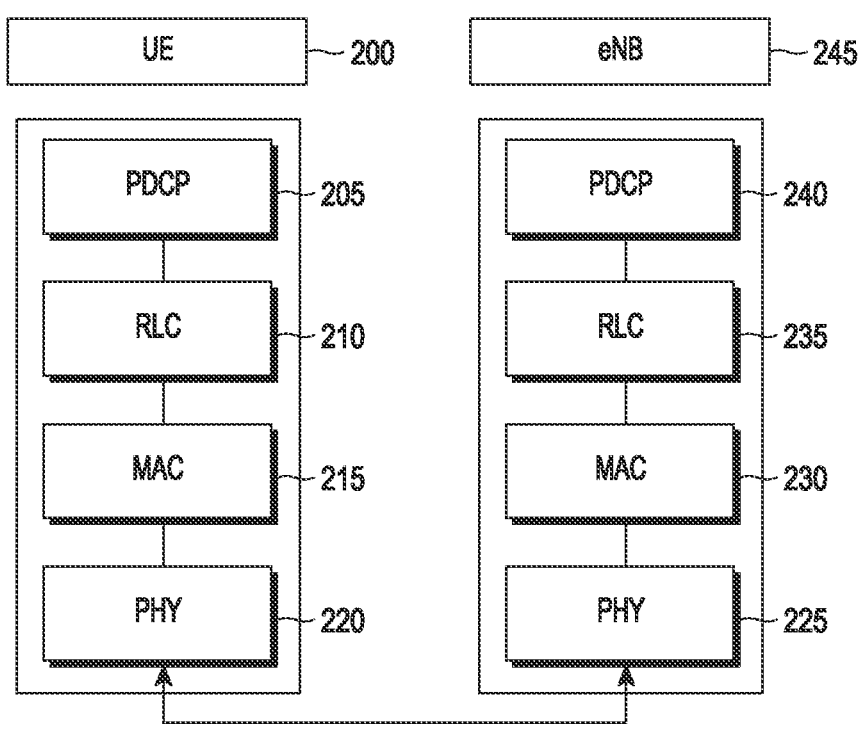
FIG. 2 is a view illustrating a radio protocol structure of an LTE system according to an embodiment.

FIG. 2 is a view illustrating a radio protocol structure of an LTE system according to an embodiment.

Referring to FIG. 2, wireless protocols of an LTE system may include packet data convergence protocols (PDCPs) 205 and 240, radio link controls (RLCs) 210 and 235, and access controls (MACs) 215 and 230 in the UE 200 and the ENB 245, respectively. The PDCPs 205 and 240 may be in charge of IP header compression/reconstruction.

The main functions of the PDCP layer entity 301 or 311 may be summarized as follows.

Header compression and decompression (ROHC only)

Transfer of user data

In-sequence delivery of upper layer PDUs at PDCP re-establishment procedure for RLC AM For split bearers in DC (only support for RLC AM), PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The radio link control (RLC) entities 210 and 235 may reconfigure PDCP packet data units (PDUs) into a proper size and perform automatic repeat request (ARQ) operations. The main functions of the RLCs 210 and 235 may be summarized as follows.

Transfer of upper layer PDUs

Error correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer entities 215 and 230 may be connected with several RLC layer entities 210 and 235 configured in one UE and may multiplex the RLC PDUs into the MAC PDU and demultiplex the MAC PDU into RLC PDUs. The main functions of the MACs 215 and 230 may be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Hybrid automatic repeat request (HARQ) function(Error correction through HARQ)

Priority handling between logical channels of one UE

Priority handling between UEs by means of dynamic scheduling

MBMS service identification

Transport format selection

Padding

The physical layer (NR PHY) devices 220 and 225 channel-code and modulate higher layer data into OFDM symbols, transmit the OFDM symbols through a radio channel or demodulates OFDM symbols received through a radio channel, channel-decodes and transfers the same to a higher layer.

Figure 3:
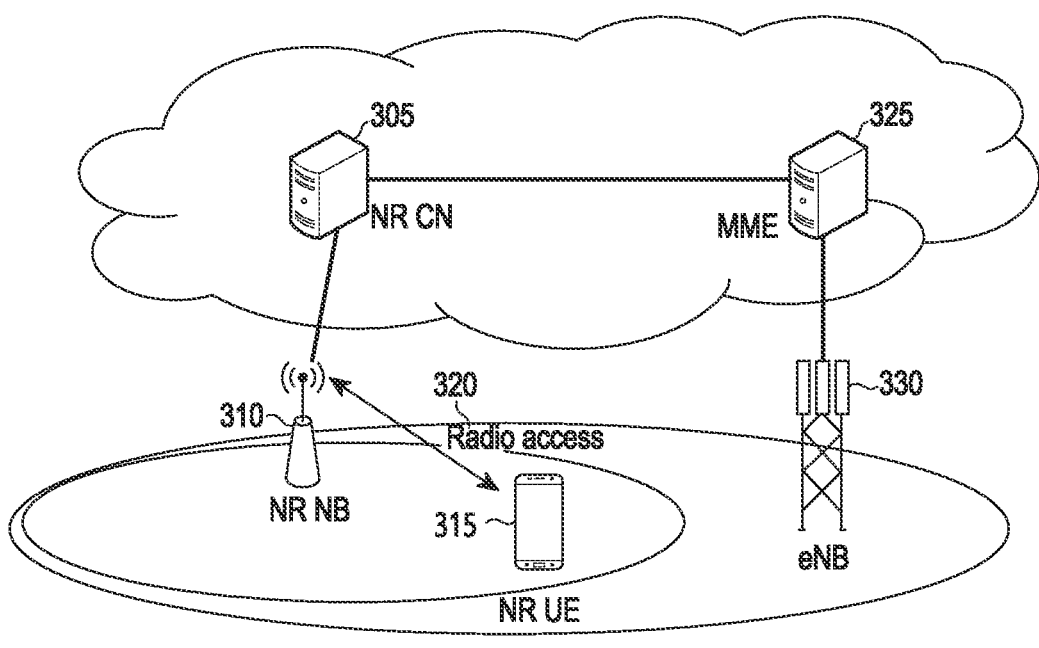
FIG. 3 is a view illustrating a structure of a next-generation mobile communication system according to an embodiment.

FIG. 3 is a view illustrating a structure of a next-generation (new radio (NR) or 5g) mobile communication system according to an embodiment.

Referring to FIG. 3, a radio access network of a next-generation mobile communication system (hereinafter, NR or 5g) may include a next-generation base station (new radio node B (hereinafter, gNB or NR NB or NR gNB or NR base station)) 310 and a next-generation radio core network (NR CN) 305. A next-generation radio user equipment (hereinafter, NR UE or UE) 315 may access an external network through the NR gNB 310 and the NR CN 305.

The NR gNB 310 may correspond to the evolved node B (eNB) of the legacy LTE system. The NR gNB 310 is connected with the NR UE 315 via a radio channel and may provide a superior service to that of the legacy node B. In a next-generation mobile communication system, all user traffic may be served through a shared channel. Accordingly, a device for performing scheduling by collecting status information, such as buffer status, available transmission power status, and channel state of the UE 315, is required, and the NR NB 310 may take a role.

One NR gNB 310 typically may control multiple cells. In the next-generation mobile communication system, a bandwidth higher than the current maximum bandwidth may be applied to implement ultra high-speed data transmission over the current LTE. Further, a beamforming technology may be additionally applied using orthogonal frequency division multiplexing (OFDM) as a radio access technology. Further, adaptive modulation & coding (hereinafter, AMC) that determines a modulation scheme and a channel coding rate in compliance with the channel state of the UE 315 may be applied.

The NR CN 305 may perform functions such as mobility support, bearer configuration, and quality of service (QoS) configuration. The NR CN 305 is a device in charge of various control functions as well as the mobility management function for the UE 315, and may be connected to the plurality of base stations. Further, the next-generation mobile communication system may be linked with the legacy LTE system. The NR CN 305 may be connected to the MME 325 through a network interface. The MME 325 may be connected to the eNB 330 which is a legacy base station.

Figure 4:
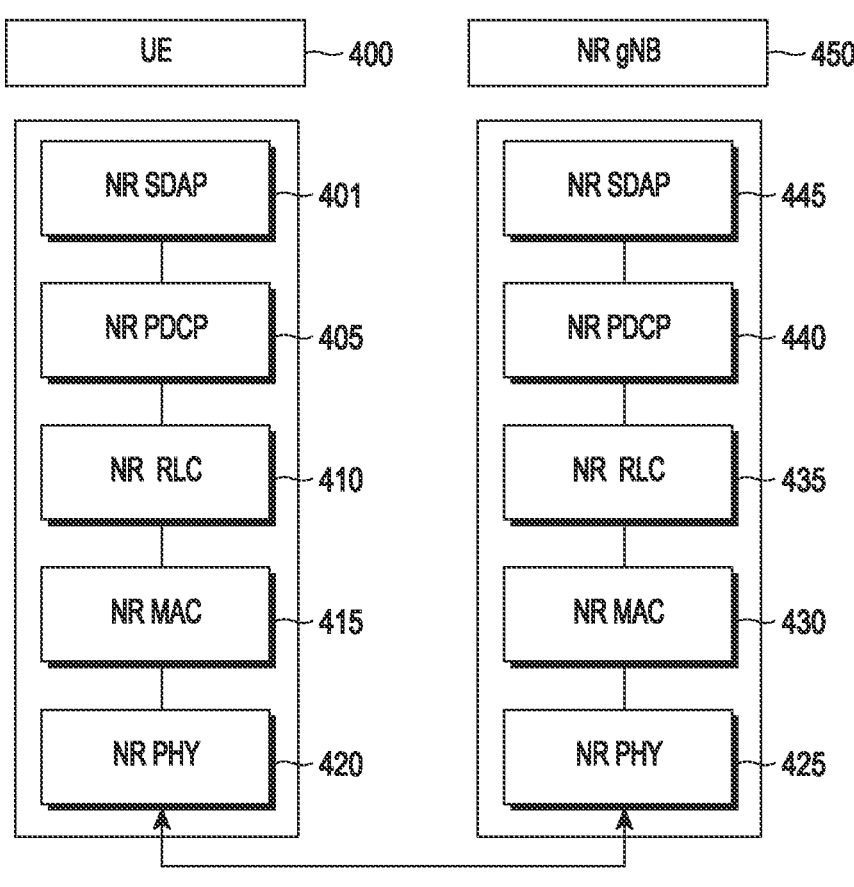
FIG. 4 is a view illustrating a structure of a radio protocol of a next-generation mobile communication system according to an embodiment.

FIG. 4 is a view illustrating a structure of a radio protocol of a next-generation mobile communication system according to an embodiment.

Referring to FIG. 3, the radio protocols for the next-generation mobile communication system include NR service data application protocols (SDAPs) 401 and 445, NR PDCPs 405 and 440, NR RLCs 410 and 435, and NR MACs 415 and 430, in a UE 400 and an NR base station 450, respectively.

The main functions of the NR SDAP entities 401 and 445 may include some of the following functions.

transfer of user plane data mapping between a QoS flow and a DRB (data radio bearer) for both DL and UL marking QoS flow ID in both DL and UL packets reflective QoS flow to DRB mapping for the UL SDAP PDUs For the SDAP layer device 401, the UE may be configured as to whether to use the header of the SDAP layer entity 401 or the function of the SDAP layer entity 401 for each PDCP layer entity 405, for each bearer, or for logical channel, through a radio resource control (RRC) message. When the SDAP header is configured, the UE may indicate, through the non-access stratum (NAS) quality of service (QoS) reflective configuration 1-bit indicator (NAS reflective QoS) of the SDAP header and the access stratum (AS) QoS reflective configuration 1-bit indicator (AS reflective QoS), to allow the UE to update or reconfigure mapping information about the data bearer and QoS flow of uplink and downlink. The SDAP header may include QoS flow ID information indicating QoS. The QoS information may be used as data priority handling or scheduling information for seamlessly supporting a service.

The main functions of the NR PDCP entities 405 and 440 may include some of the following functions.

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above description, the reordering function of the NR PDCP devices 405 and 440 may refer to a function of reordering PDCP PDUs received from a lower layer in order based on a PDCP sequence number (SN). The reordering by the NR PDCP devices 405 and 440 may include transferring the data to the higher layer in the reordered sequence or immediately without considering order, recording PDCP PDUs missed by reordering, reporting the state of the missing PDCP PDUs to the transmit part, and requesting to retransmit the missing PDCP PDUs.

The main functions of the NR RLC entities 410 and 435 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, the in-sequence delivery of the NR RLC layer devices 410 and 435 may refer to a function of sequentially delivering RLC SDUs received from a lower layer to an upper layer. When originally one RLC SDU is divided into several RLC SDUs and received, the in-sequence delivery function of the NR RLC layer devices 410 and 435 may include a function of reassembling and delivering the same.

The in-sequence delivery of the NR RLC layer entities 410 and 435 may include a function of reordering the received RLC PDUs based on an RLC sequence number (SN) or a PDCP sequence number (SN), a function of reordering and recording the lost RLC PDUs, a function of reporting the status of the lost RLC PDUs to the transmitting side, and a function of requesting retransmission of the lost RLC PDUs.

The in-sequence delivery of the NR RLC layer entities 410 and 435 may include a function of sequentially delivering, when there is a lost RLC SDU, only RLC SDUs before the lost RLC SDU to the upper layer.

The in-sequence delivery of the NR RLC layer entities 410 and 435 may include a function of sequentially delivering all RLC SDUs received before a predetermined timer starts to the upper layer if the predetermined timer expires even if there is a lost RLC SDU.

The in-sequence delivery of the NR RLC layer entities 410 and 435 may include a function of sequentially delivering all RLC SDUs received so far to the upper layer if the predetermined timer expires even when there is a lost RLC SDU.

The NR RLC layer entities 410 and 435 may process RLC PDUs in the order of reception regardless of the order of sequence numbers (out of sequence delivery) and deliver the RLC PDUs to the NR PDCP device.

When the NR RLC layer entities 410 and 435 receive a segment, the NR RLC layer entities 410 and 435 may receive segments stored in a buffer or to be received later, reconfigure the segments into one complete RLC PDU, and transmit the same to the NR PDCP device.

The NR RLC layer entities 410 and 435 may not include a concatenation function, and the NR MAC layer may perform the function, or it may be replaced with the multiplexing function of the NR MAC layer.

In the above description, the out-of-sequence delivery of the NR RLC devices 410 and 435 may refer to a function of directly delivering RLC SDUs received from a lower layer to an upper layer regardless of the order. The out-of-sequence delivery of the NR RLC devices 410 and 435 may include a function of, when originally one RLC SDU is divided into several RLC SDUs which are then received, reassembling and delivering the several RLC SDUs. The out-of-sequence delivery of the NR RLC devices 410 and 435 may include a function of storing the RLC SN or PDCP SN of the received RLC PDUs, arranging the order thereof, and recording the lost RLC PDUs.

The NR MAC layer entities 415 and 430 may be connected to several NR RLC layer entities 410 and 435 configured in one device, and the main functions of the NR MAC 415 and 430 may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR physical layer (NR PHY layer) devices 420 and 425 channel-code and modulate higher layer data into OFDM symbols, transmit the OFDM symbols through a radio channel or demodulates OFDM symbols received through a radio channel, channel-decodes and transfers the same to a higher layer.

Figure 5:
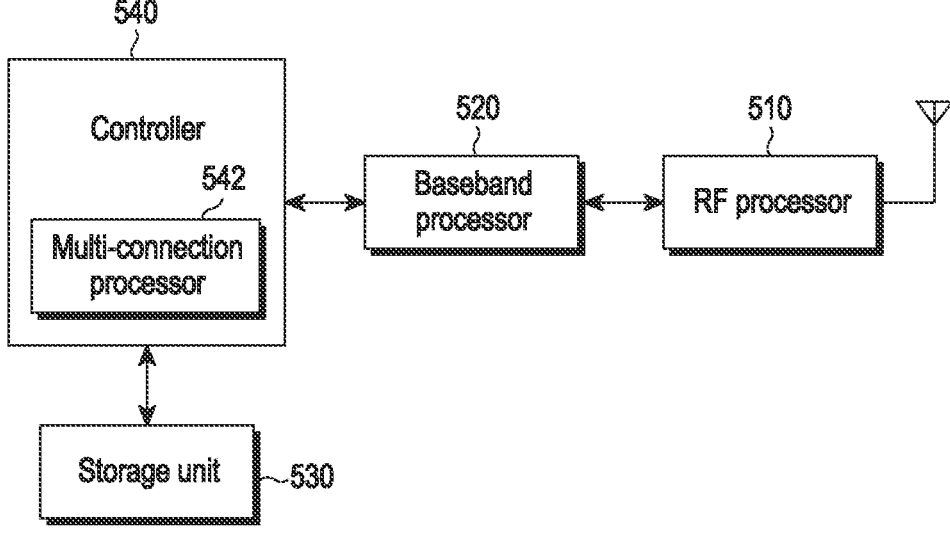
FIG. 5 is a block diagram illustrating an inner structure of a UE according to an embodiment.

FIG. 5 is a block diagram illustrating an inner structure of a UE according to an embodiment.

Referring to FIG. 5, a UE may include a radio frequency (RF) processor 510, a baseband processor 520, a storage unit 530, and a controller 540. Further, the controller 540 may include a multi-connection processor 542.

The RF processor 510 performs functions for transmitting/receiving signals through a radio channel, such as signal band conversion or amplification. The RF processor 510 may up-convert a baseband signal provided from the baseband processor 520 into an RF band signal and then transmit the RF band signal through an antenna, and may down-convert an RF band signal received through the antenna into a baseband signal. For example, the RF processor 510 may include at least one of a transmission filter, a reception filter, an amplifier, a mixer, an oscillator, a digital-to-analog converter (DAC), or an analog-to-digital converter (ADC). In the figure, only one antenna is shown, but the UE may include a plurality of antennas. The RF processor 510 may include multiple RF chains. Further, the RF processor 510 may perform beamforming. For beamforming, the RF processor 510 may adjust the phase and magnitude of each of the signals transmitted/received through the plurality of antennas or antenna elements. Further, the RF processor 510 may perform MIMO and receive several layers upon performing the MIMO operation.

The baseband processor 520 performs the function of conversion between a baseband signal and bit stream according to the system physical layer specifications. For example, upon data transmission, the baseband processor 520 encodes and modulates a transmission bit stream, thereby generating complex symbols. Further, upon data reception, the baseband processor 520 restores the reception bit stream by demodulating and decoding the baseband signal provided from the RF processor 510. For example, in the case of following the orthogonal frequency division multiplexing (OFDM) scheme, upon data transmission, the baseband processor 520 may generate complex symbols by encoding and modulating the transmission bit stream, map the complex symbols to a subcarrier, and then configures OFDM symbols through inverse fast Fourier transform (IFFT) operation and cyclic prefix (CP) insertion. Further, upon data reception, the baseband processor 520 divides the baseband signal provided from the RF processor 510 into OFDM symbol units, restores the signals mapped to the subcarriers through fast Fourier transform (FFT), and then restores the reception bit stream through demodulation and decoding.

The baseband processor 520 and the RF processor 510 may transmit and receive signals as described above. Accordingly, the baseband processor 520 and the RF processor 510 may be referred to as a transmitter, a receiver, a transceiver, or a communication unit. Further, at least one of the baseband processor 520 and the RF processor 510 may include a plurality of communication modules for supporting a plurality of different radio access technologies. Further, at least one of the baseband processor 520 and the RF processor 510 may include different communication modules for processing signals in different frequency bands. For example, the different radio access technologies may include, e.g., wireless LAN (e.g., IEEE 802.11) or cellular network (e.g., LTE). Further, the different frequency bands may include a super-high frequency (SHF) (e.g., 2.NRHz or NRHz) band or millimeter wave (mmWave) (e.g., 60 GHz) band.

The storage unit 530 stores a basic program for operating the UE, application programs, configuration information, or other data. In particular, the storage unit 530 may store information related to the second access node performing wireless communication using the second radio access technology. Further, the storage unit 530 provides the stored data at the request of the controller 540.

The controller 540 controls the overall operation of the UE. For example, the controller 540 transmits/receives signals through the baseband processor 520 and the RF processor 510. Further, the controller 540 records and reads data in/from the storage unit 540. To that end, the controller 540 may include at least one processor. For example, the controller 540 may include a communication processor (CP) that performs control for communication and an application processor (AP) that controls an upper layer, such as an application program. Further, the controller 540 may control the operation of the UE or an entity corresponding thereto according to various embodiments.

Figure 6:
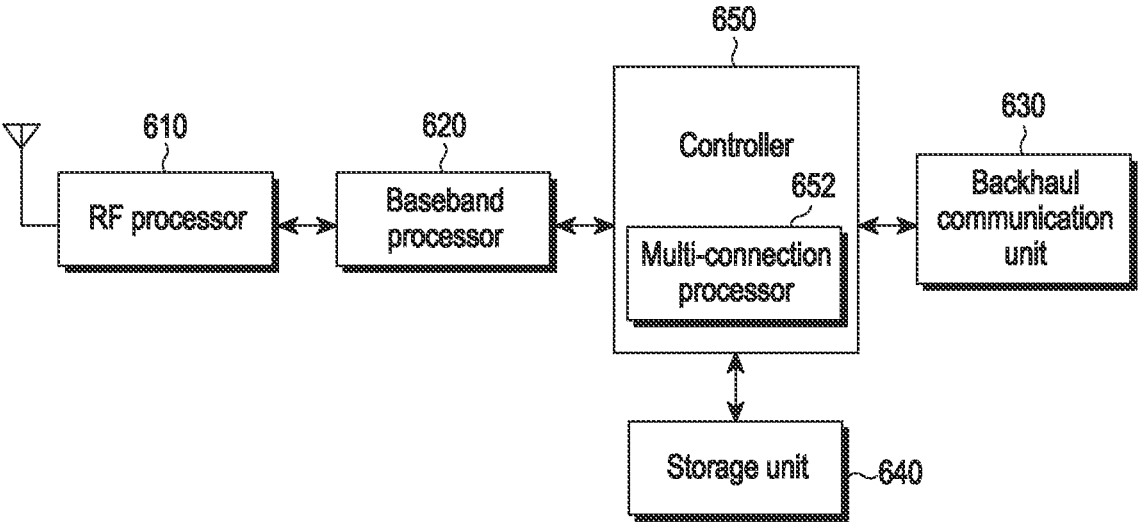
FIG. 6 is a block diagram illustrating a configuration of a base station according to an embodiment.

FIG. 6 is a block diagram illustrating a configuration of a base station according to an embodiment.

Referring to FIG. 6, the base station may include an RF processor 610, a baseband processor 620, a backhaul communication unit 630, a storage 640, and a controller 650. The controller 650 may include a multi-connection processor 652.

The RF processor 610 performs a function for transmitting and receiving a signal through a radio channel such as band conversion and amplification of a signal. In other words, the RF processor 610 up-converts the baseband signal provided from the baseband processor 620 into an RF band signal, transmits it through the antenna, and down-converts the RF band signal received through the antenna into a baseband signal. For example, the RF processor 610 may include at least one of a transmission filter, a reception filter, an amplifier, a mixer, an oscillator, a DAC, or an ADC. In the figure, only one antenna is shown, but the first access node may include a plurality of antennas. The RF processor 610 may include multiple RF chains. Further, the RF processor 610 may perform beamforming. For beamforming, the RF processor 610 may adjust the phase and magnitude of each of the signals transmitted/received through the plurality of antennas or antenna elements. The RF processor 610 may perform a downward MIMO operation by transmitting one or more layers.

The baseband processor 620 performs the function of conversion between a baseband signal and bit stream according to the physical layer specifications of the first radio access technology. For example, upon data transmission, the baseband processor 620 encodes and modulates a transmission bit stream, thereby generating complex symbols. Further, upon data reception, the baseband processor 620 restores the reception bit stream by demodulating and decoding the baseband signal provided from the RF processor 610. For example, in the case of following the OFDM scheme, upon data transmission, the baseband processor 620 may generate complex symbols by encoding and modulating the transmission bit stream, map the complex symbols to a subcarrier, and then configures OFDM symbols through IFFT operation and CP insertion. Further, upon data reception, the baseband processor 620 divides the baseband signal provided from the RF processor 610 into OFDM symbol units, restores the signals mapped to the subcarriers through the FFT, and then restores the reception bit stream through demodulation and decoding. The baseband processor 620 and the RF processor 610 may transmit and receive signals as described above. Accordingly, the baseband processor 620 and the RF processor 610 may be referred to as a transmitter, a receiver, a transceiver, a communication unit, or a wireless communication unit.

The backhaul communication unit 630 provides an interface for communicating with other nodes in the network. In other words, the backhaul communication unit 630 converts the bit stream transmitted from the base station to another node, e.g., auxiliary base station or core network, into a physical signal, and converts the physical signal received from the other node into a bit stream.

The storage unit 640 stores a basic program for operating the base station, application programs, configuration information, or other data. In particular, the storage unit 640 may store, e.g., information about the bearer allocated to the connected UE and the result of measurement reported from the connected UE. Further, the storage unit 640 may store information that serves as a reference for determining whether to provide multiple connections to the UE or stop. Further, the storage unit 640 provides the stored data at the request of the controller 650.

The controller 650 controls the overall operation of the base station. For example, the controller 650 transmits and receives signals through the baseband processor 620 and the RF processor 610 or through the backhaul communication unit 630. Further, the controller 650 records and reads data in/from the storage unit 640. To that end, the controller 650 may include at least one processor. Further, the controller 650 may control the operation of the base station or an entity corresponding thereto according to various embodiments.

In dual connection or dual connectivity (DC), the UE may simultaneously connect to a master cell group (MCG) through a master node (MN) and at least one secondary cell group (SCG) through at least one secondary node (SN). In various embodiments, the master node MN may be interpreted as a master node B or a master base station, and the secondary node SN may be interpreted as a secondary node B or a secondary base station. In various embodiments, the MN and the SN may be base stations using different radio access technologies (RATs), or may be base stations using the same RAT. The MN and SN may be distinguished using general expressions such as a first base station, a second base station, and the like. In various embodiments, the radio resource control (RRC) message transmitted by the MN may be referred to as an MN RRC message. Also, the RRC message generated by the SN may be referred to as an SN RRC message.

In various embodiments, the dual connectivity may include at least one of LTE-NR dual connectivity (ENDC) related to the evolved packet core network (EPC) and multi-RAT dual connectivity (MRDC) related to the 5g core network (5gc), and may include operations of the network and the UE according to RATs of the MN and the SN.

In an embodiment, the network node (e.g., MN or SN) may provide conditional reconfiguration information about one or more candidate target cells (hereinafter, referred to as candidate cells) for the UE. The conditional reconfiguration information may include configuration parameters for supporting conditional mobility of the UE. The UE may evaluate conditions for each configured candidate cell and apply the conditional configuration related to the target cell meeting associated execution conditions. The conditional reconfiguration of the UE may be performed by at least one of conditional handover (CHO), conditional primary SCG cell addition (CPA), or conditional primary SCG cell change (CPC). Here, CPA or CPC may be collectively referred to as CPAC.

The conditional reconfiguration information for the conditional mobility may include information indicating a configuration to be applied to a specific candidate cell and information indicating a condition for triggering the conditional movement to the candidate cell, and condReconfig Id for identifying the pair of configuration and condition may be allocated by the network, and the network may change and remove the pair corresponding to the condReconfig Id. ConditionalReconfiguration, which is conditional reconfiguration information provided through RRC signaling, may include Id (e.g., referred to as 'condReconfigId'), configuration information (e.g., referred to as 'condRRCReconfig' or 'condReconfig') for a specific candidate, and condition information (e.g., referred to as 'condExecutionCond') for triggering conditional movement to the candidate. If conditional reconfiguration information for the specific candidate is given, the UE performs a measurement operation for evaluating the condition given by the conditional reconfiguration information and stores the configuration given by the conditional reconfiguration information in the internal storage of the UE. Accordingly, one piece of conditional reconfiguration information may correspond to one measurement operation and one storage occupation operation.

Depending on the processing capacity of the UE, the size of the storage that the UE may store at the same time and the number of measurement operations that may be evaluated at the same time are limited. Therefore, the number of pieces of conditional reconfiguration information that may be configured for the UE is limited depending on performance information related to the processing capacity of the UE.

When conditional PSCell addition/change (CPAC) is performed or when conditional handover (CHO) and CPAC are performed simultaneously, each of the MN and SN may independently configure conditional reconfiguration information. Conditional reconfiguration information configured by the MN may be stored and managed in VarConditionalReconfig, which is a variable in the MN, and conditional reconfiguration information configured by the SN may be stored and managed in VarConditionalReconfig in the SN. The MN and SN may perform coordination on the number of pieces of conditional reconfiguration information. In an embodiment, the conditional reconfiguration information configured by the MN and SN is as follows.

In the case of CPAC, conditional reconfiguration information for Intra-SN conditional PSCell change (CPC) may be configured and allocated by the SN. Conditional reconfiguration information for the Inter-SN CPC or CPA may be configured and allocated by the MN. The condReconfig Id may be used repeatedly by the MN and the SN, and the UE may identify whether the conditional configuration information is made in the MN or the SN according to where the conditional configuration information is located in the RRC reconfiguration message.

Figure 7B:
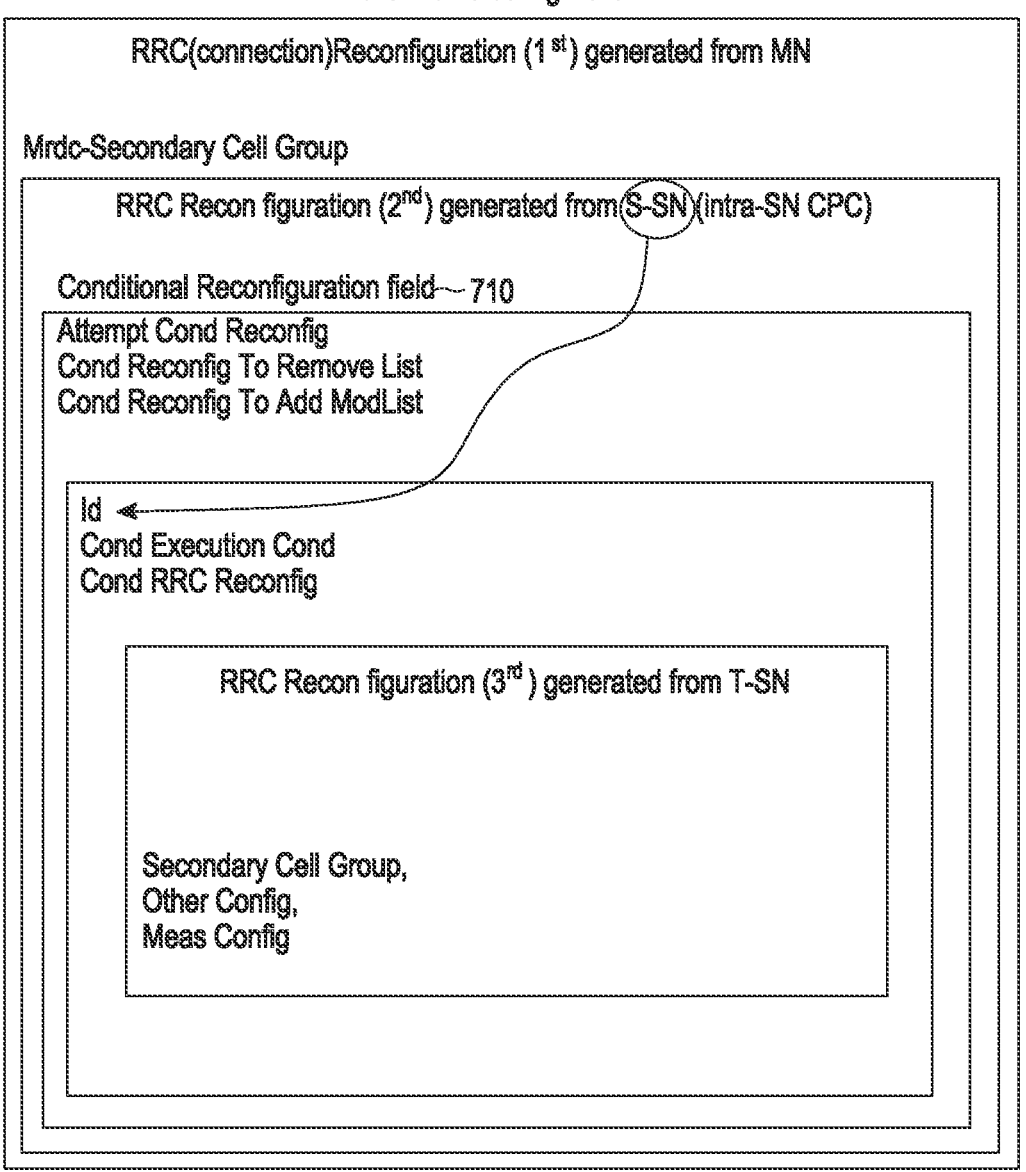

FIGS. 7A, 7B, and 7C illustrate a format of conditional reconfiguration information according to various embodiments.

Referring to FIG. 7A, a conditionalReconfiguration field 700 which is at least one piece of conditional reconfiguration information for the Inter-SN CPC may be included in an RRC reconfiguration message generated from the MN, may be configured by the MN, and may be allocated to the UE. The conditionalReconfiguration field 700 for the Inter-SN CPC may include an Id, condExecutionCond and condExecutionCond2 indicating condition information, and ConfdRRCReconfig indicating configuration information.

Referring to FIG. 7B, the RRC reconfiguration message generated from the MN may include an RRC reconfiguration message generated from the SN, and the RRC reconfiguration message generated from the SN may include a conditionalReconfiguration field 710 which is at least one piece of conditional reconfiguration information for the Intra-SN CPC. The conditionalReconfiguration field 710 for the intra-SN CPC may include an Id, condExecutionCond indicating condition information, and CondRRCReconfig indicating configuration information.

Referring to FIG. 7C, the RRCReconfiguration message received by the UE through the SRB3 may include a conditionalReconfiguration field 720 that is at least one piece of conditional reconfiguration information for the intra-SN CPC. The configuration information, condReconfig, included in all conditionalReoncifugraiotn fields 720 may be configured from the SN. Further, if the RRCReconfiguration message included in the SecondaryCellGroup field of the outer RRCReconfiguration message includes the conditionalReconfiguration field although received by the SRB1, the condReconfig included in the conditionalReconfiguration field is for the intra-SN CPC and may be identified as being configured by the SN. If the outer RRCReconfiguration message received by the SRB1 includes a conditionalReconfiguraiton field, the condReconfig included in the conditionalReconfiguration field is for the inter-SN CPC and may be identified as being allocated and configured by the MN.

In an embodiment, when the CPAC and the CHO coexist and are configured in the UE, the outer RRCReconfiguration message received by the SRB1 includes a conditionalReconfiguration field, and when the RRCReconfiguration message corresponding to the condRRCReconfig in the conditionalReconfiguration includes a reconfigurationwithsync field for the MCG configuration or a reconfigurationwithsync field for the CHO or SCG configuration, the UE may be identified as inter-SN CPC or CPA. The UE may distinguish conditional reconfiguration information allocated by the MN and the SN through the relative positions of the fields and the transmitted SRB, store each piece of conditional reconfiguration information in VarConditionalReconfig for the MCG and VarConditionalReconfig for the SCG in the UE according to the result of the distinguishment, and may add/modify/release the stored conditional reconfiguration information.

In an embodiment, when the capacity of the UE is determined for the number of the pieces of conditional reconfiguration information, the MN and the SN may perform a procedure of distributing the number of the pieces of conditional reconfiguration information to each other within the determined capacity.

In an embodiment, the MN may notify the SN of maxCondReconfigIdSCG indicating a specific number to be allocated by the SN among the number of pieces of conditional reconfiguration information operable by the UE. The SN may configure or allocate conditional reconfiguration information to the UE within the number corresponding to the maxCondReconfigIdSCG. In an embodiment, maxNrofCondReconfig indicating the maximum number of pieces of conditional reconfiguration information operable by the UE may be included in the performance information transmitted by the UE and may be transmitted to the MN and/or SN.

In an embodiment, the inter-node message transmitted by the MN to the SN may include a signaling field indicating the number of pieces of conditional reconfiguration information that the SN may allocate to the UE. For example, the CG-ConfigInfo in the inter-node message may include a ConfigRestrictInfo field, and the ConfigRestrictInfo field may include information indicating the maximum number of pieces of conditional reconfiguration information that the SN may configure in the UE. In an embodiment, the information may be as follows.

Maximum allowable number of condReconfig/condReconfig ID configured by SN; or

Maximum allowable number of condReconfig configured for intra-SN CPC by SN

In an embodiment, the SN may send, to the MN, a request for information related to the number of pieces of conditional reconfiguration information that may be configured in the UE.

For example, the SN may include information on the number of pieces of conditional reconfiguration information desired by the SN in the requestedMaxCondReconfigIdSCG field included in the CG-Config message transferred to the MN.

For example, a signaling field including information about the number of pieces of conditional reconfiguration information desired by the SN may be included in the inter-node message transferred to the MN. For example, ConfigRestrictModReqSCG may be included in the CG-Config field in the inter-node message, and the ConfigRestrictModReqSCG may include the number of pieces of conditional reconfiguration information that the SN may configure in the UE in the format of INTEGER (1 . . . maxNrofCondReconfig).

The MN may re-transfer MaxCondReconfigIdSCG indicating the number of pieces of conditional reconfiguration information finally determined in consideration of the information provided from the SN back to the SN.

In an embodiment, in the case of the Inter-SN CPC, the conditional reconfiguration information for the UE may be allocated by the MN. The MN may receive information about candidate cells from the source secondary node S-SN, request candidate admission from the target secondary node T-SN in consideration of the candidate cells, and control the number of pieces of conditional reconfiguration information that may be operated by the MN according to the number of pieces of candidate cells that have succeeded in candidate admission.

Figure 8:
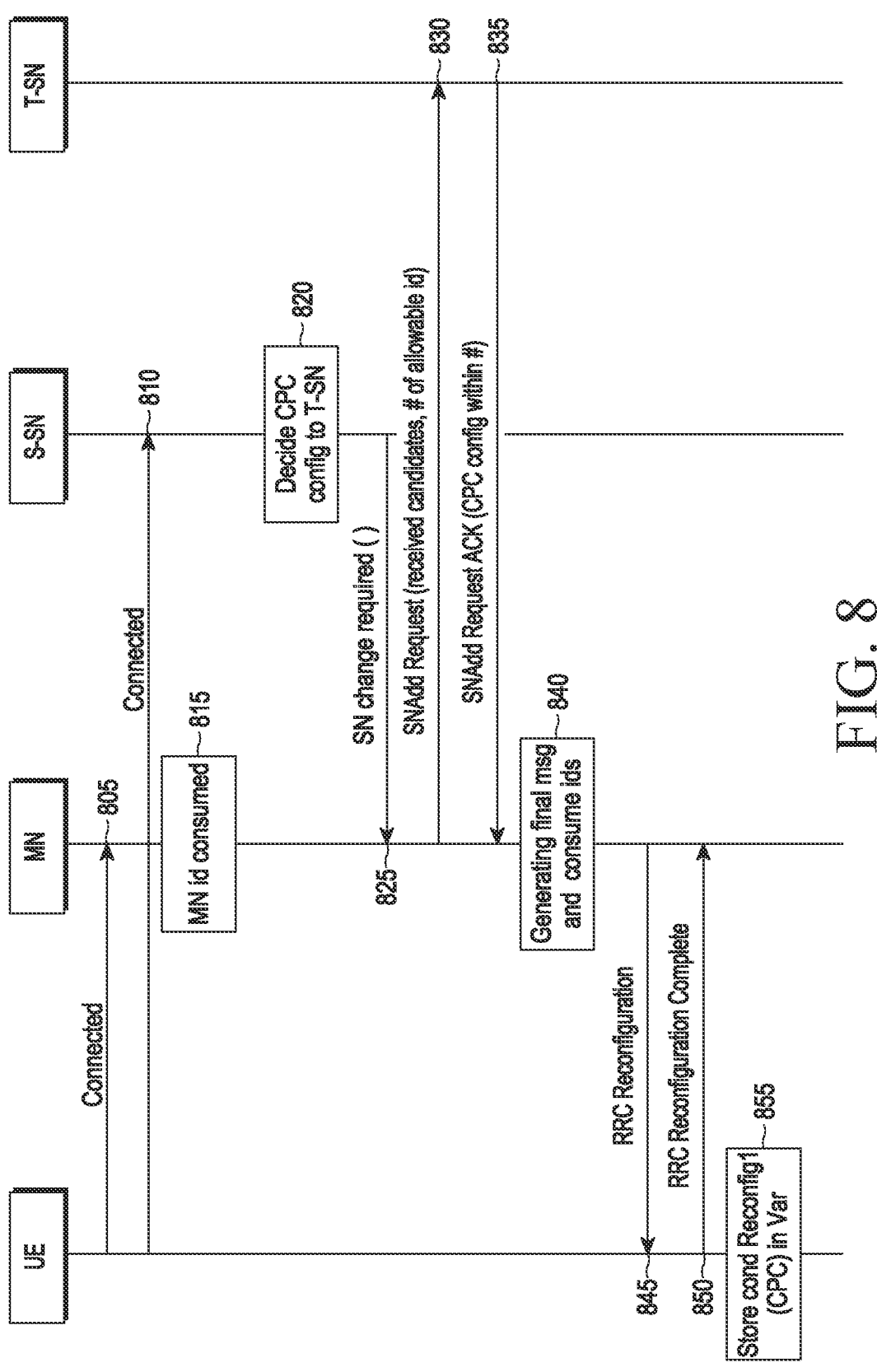
FIG. 8 is a signal flowchart illustrating a procedure for notifying a T-SN of the number of pieces of conditional reconfiguration information that may be added by an MN according to an embodiment of the disclosure.

FIG. 8 is a signal flowchart illustrating a procedure for notifying a T-SN of the number of pieces of conditional reconfiguration information that may be added by an MN according to an embodiment of the disclosure.

Referring to FIG. 8, the UE may establish a connection with the MN in operation 805 and may establish a connection with the source SN (S-SN) in operation 810. In operation 815, the MN may allocate and identify the MN Id. In operation 820, the S-SN may trigger the CPC for the target SN (T-SN) and may determine the CPC configuration (i.e., conditional reconfiguration information for the CPC). In operation 825, the S-SN may transmit an SN change request message (e.g., 'SN change required') for the Inter-CPC to the MN. The MN may receive an SN change request message for the Inter-CPC from the S-SN, and, in operation 830, may transmit an SN addition request message (e.g., "SNAdditionReq" or "SNAddRequest") to the T-SN indicated by the SN change request message. The SN addition request message may include candidate cell information (e.g., 'received candidates') and information about CPC configuration preparation, and may also include information (e.g., '# of allowable id') indicating the number of pieces of conditional reconfiguration information additionally operable in the MN.

Upon receiving the information indicating the number of pieces of conditional reconfiguration information, the T-SN may prepare a CPC configuration for a limited number of candidates within the indicated number of pieces of conditional reconfiguration information while admitting candidates indicated by the candidate cell information. In operation 835, the T-SN may transmit an SN addition request acknowledge (e.g., "SNAddRequestACK") message including the limited number of pieces of CPC configuration information (e.g., "CPC config within #") to the MN.

Upon receiving the CPC configuration information, the MN may assign an Id to conditional reconfiguration information of candidate cells corresponding to the CPC configuration information to the UE in operation 840, and may transmit an RRC reconfiguration message (e.g., 'RRCReconfiguration') including the conditional reconfiguration information to the UE in operation 845. In operation 850, the UE may transmit an RRC reconfiguration complete message (e.g., 'RRCReconfigurationComplete') responsive to the RRC reconfiguration message to the MN. In operation 855, the UE may store conditional reconfiguration information that does not exceed the processing capacity of the conditional reconfiguration information operable for the MN in VarConditionalReconfig inside the UE, and may perform measurement for evaluating the CPC trigger condition corresponding to each candidate target cell within the processing capacity of the UE.

Figure 9:
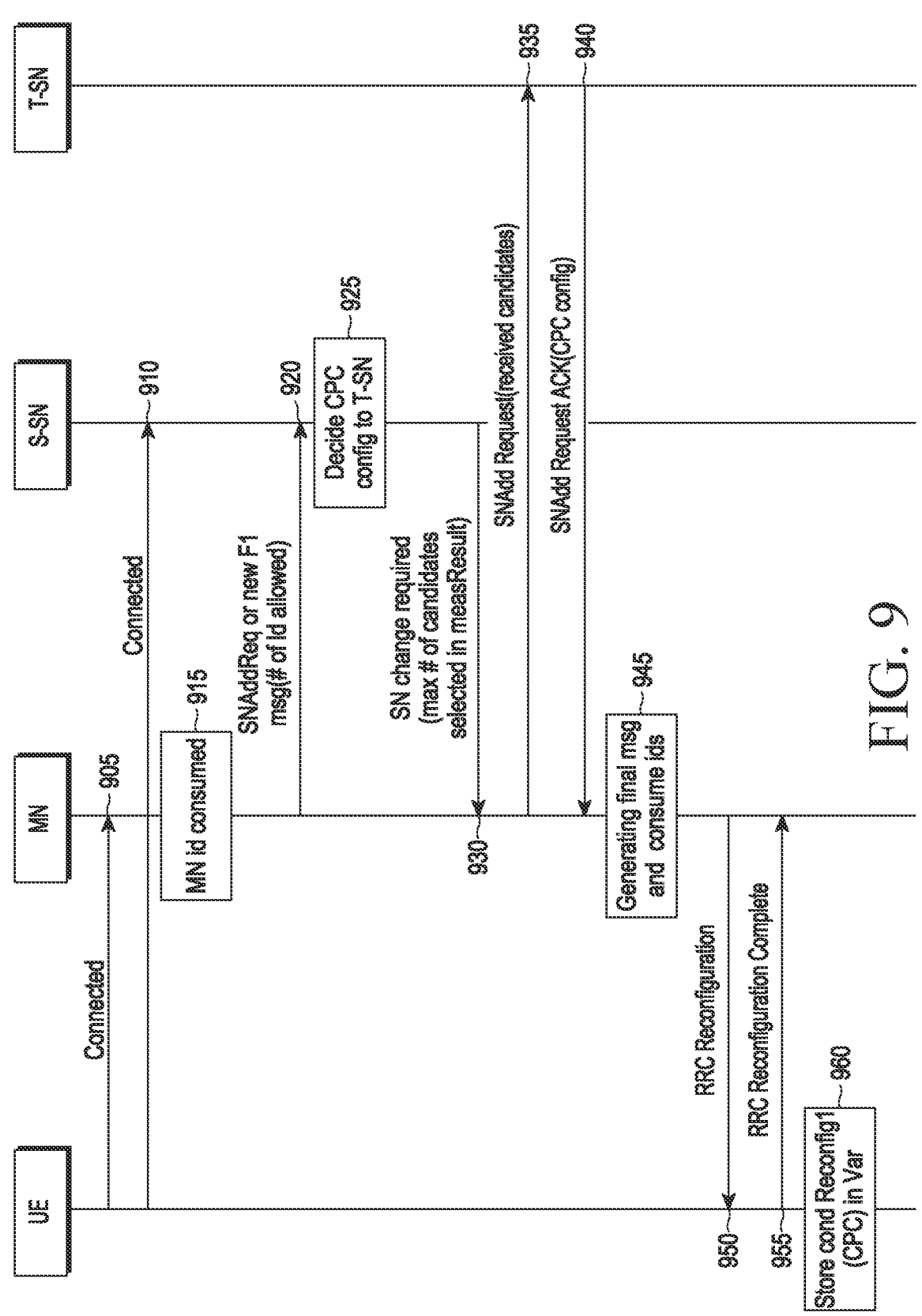
FIG. 9 is a signal flowchart illustrating a procedure for notifying an S-SN of the number of pieces of conditional reconfiguration information that may be added by an MN according to an embodiment of the disclosure.

FIG. 9 is a signal flowchart illustrating a procedure for notifying an S-SN of the number of pieces of conditional reconfiguration information that may be added by an MN according to an embodiment of the disclosure.

Referring to FIG. 9, the UE may establish a connection with the MN in operation 905 and may establish a connection with the source SN (S-SN) in operation 910. In operation 915, the MN may allocate and identify the MN Id. In operation 920, the MN may transmit, to the S-SN, a message including information (e.g., '# of Id allowed') indicating the number of pieces of conditional reconfiguration information operable by the MN. The message may be, e.g., an SN addition request message or a new F1 message using the F1 protocol between nodes B.

In operation 925, the S-SN may trigger the CPC for the T-SN and determine the CPC configuration. In the CPC configuration, the S-SN may determine candidate cells within a range of the number of pieces of conditional reconfiguration information indicated by the MN. In operation 930, the S-SN transfers, to the MN, an SN change request message (e.g., 'SN change required') including at least one of information (e.g., a measurement result of candidate cells and a cell ID, a physical cell ID (PCI), or a cell global identity (CGI)) about the candidate cell and a CPC trigger condition for each candidate cell determined within a range of the number of pieces of the conditional reconfiguration information. The SN change request message may include information related to candidate cells selected within a range of the number of pieces of conditional reconfiguration information based on the measurement result (e.g., 'measResult') of the candidate cells. Information indicating the maximum number of the selected candidate cells (e.g., 'max # of candidates selected in measResult') may be included in the SN change request message. In an embodiment, the information about the selected candidate cells may be included in the inter-node message (e.g., a 'CG-Config' field) of RRC, or may be included in the Xn-AP field of the SN change required message.=>(1-1) reflecting the standard In operation 935, the MN may include the information about the selected candidate cells provided from the S-SN in one field (e.g., "received candidates") in the SN addition request message (e.g., "SNAddRequest") and may transfer the information to the T-SN. In operation 940, the T-SN may perform CPC admission on the candidate cells identified through the addition request message, may insert an RRCReconfiguration message including configuration information (e.g., 'CPC config') for each candidate cell that has succeeded in admission into an SN addition request acknowledge message (e.g., 'SNAddReqACK'), and may transmit the SN addition request acknowledge message to the MN. In an embodiment, to prepare the CPAC for the plurality of T-SNs, the S-SN may distribute Ids of the candidate cells to each T-SN and transmit an SN addition request message including configuration information about the candidate cells according to the distribution result to each T-SN.

In operation 945, the MN may assign an Id to conditional reconfiguration information of candidate cells corresponding to the configuration information about the candidate cells to the UE in operation 840, and may transmit an RRC reconfiguration message (e.g., 'RRCReconfiguration') including the conditional reconfiguration information to the UE in operation 950. In operation 955, the UE may transmit an RRC reconfiguration complete message (e.g., 'RRCReconfigurationComplete') responsive to the RRC reconfiguration message to the MN. In operation 960, the UE may store conditional reconfiguration information about the number not exceeding the processing capacity that the UE may operate for the S-SN in VarConditionalReconfig in the UE for the S-SN, and may perform measurement for evaluating the CPC trigger condition corresponding to each candidate cell within the processing capacity of the UE.

In an embodiment, in operation 925, the S-SN may select a number of candidate cells less than or equal to the number indicated by the XnAP field received from the MN, may include, in each container, at least two measurement Ids (e.g., "measId") corresponding to the execution condition of the conditional reconfiguration for each candidate cell, a candidate cell ID (e.g., PCI and/or CGI), and a measurement result (e.g., "measResult"), and may transfer the at least one container to the MN.

Figure 10:
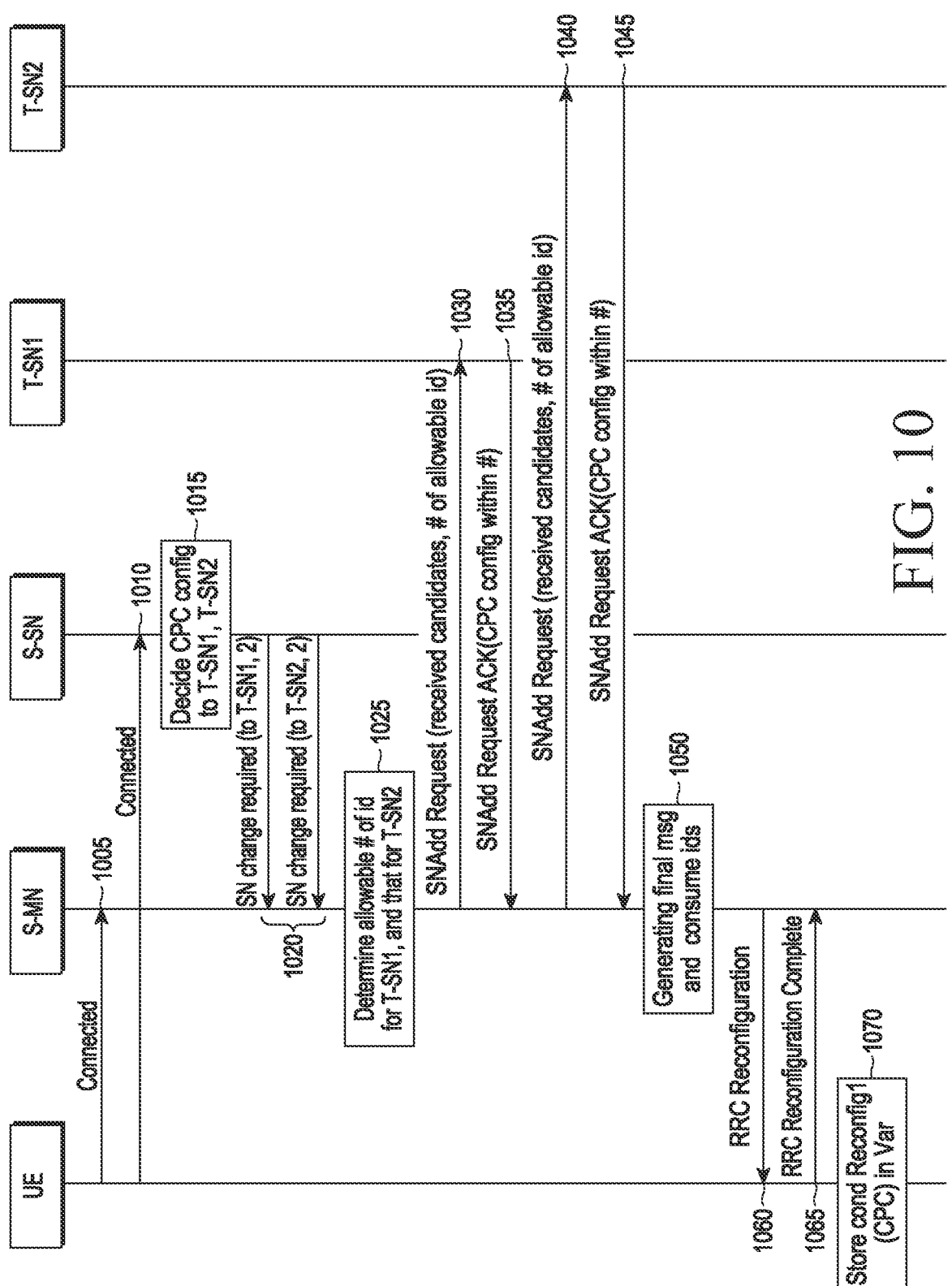
FIG. 10 is a signal flowchart illustrating a procedure in which an S-SN performs in parallel multiple CPC procedures according to an embodiment of the disclosure.

FIG. 10 is a signal flowchart illustrating a procedure in which an S-SN performs in parallel multiple CPC procedures according to an embodiment of the disclosure.

Referring to FIG. 10, the UE may establish a connection with the MN in operation 1005 and may establish a connection with the S-SN in operation 1010. In operation 1015, the S-SN triggers the CPC, and in operation 1020, includes information about how many T-SNs are to be used, i.e., how many CPC procedures are to be performed in parallel, an SN change request message (e.g., 'SN change required') for each CPC procedure and transfers the same to the MN. In the illustrated example, the S-SN may determine two target candidate cells, i.e., a CPC for T-SN1 and T-SN2, and in operation 1020, an SN addition request message for T-SN1 and an SN addition request message for T-SN2 may be transmitted from the S-SN to the MN.

In operation 1025, the MN may determine a value ('# of allowable id') indicating the maximum number of pieces of conditional reconfiguration information desired to be used by the MN for each T-SN (e.g., an allowable value for T-SN1 and an allowable value for T-SN2) with reference to the SN addition request messages, may insert the determined value into an SN addition request message (e.g., 'SNAddReq' or 'SNAddRequest') for each T-SN, and may transmit the SN addition request message to each T-SN in operations 1030 and 1040. In operations 1035 and 1045, each T-SN may perform candidate admission within a range corresponding to a value given by the SN addition request message, and may transmit an SN addition request acknowledge message (e.g., "SNAddRequestACK") to the MN. The SN addition request acknowledge message transmitted from each T-SN may include as many CPC configurations as determined within a range of allowable values for each T-SN.=>(1-2) reflecting the standard In an embodiment, in operation 1015, the S-SN may determine to perform CPC configuration for a specific UE for T-SN1 and T-SN2, and in operation 1020, the S-SN may include a value indicating the number of operable candidate cells, e.g., "2", in the SN addition request message transmitted to the MN. The SN addition request message may include an M-NG-RAN node UE XnAP ID and an S-NG-RAN node UE XnAP ID, and each of the IDs has the same value in CPC procedures. From the value '2', the MN may know that two CPC procedures for the UE are performed.

After receiving the SN addition request message, the MN may insert the maximum number of pieces of candidate cells (or the number of pieces of available conditional reconfiguration information) to be requested for each of the two T-SNs into the SN addition request message of operations 1030 and 1040 and transmit the SN addition request message to T-SN1 and T-SN2, and in operations 1035 and 1045, T-SN1 and T-SN2 may admit candidate cells within a range of the number of pieces of conditional reconfiguration information designated by the SN addition request message.

In operation 1050, the MN may assign an Id to conditional reconfiguration information of each candidate cell based on the candidate cells admitted in the T-SNs, and may transmit an RRC reconfiguration message (e.g., 'RRCReconfiguration') including the conditional reconfiguration information to the UE in operation 1060. In operation 1065, the UE may transmit an RRC reconfiguration complete message (e.g., 'RRCReconfigurationComplete') responsive to the RRC reconfiguration message to the MN. In operation 1070, the UE may store, for each T-SN, conditional reconfiguration information that does not exceed the processing capacity of the conditional reconfiguration information operable for each T-SN in VarConditionalReconfig inside the UE, and may perform measurement for evaluating the CPC trigger condition corresponding to each candidate cell within the processing capacity of the UE.

Figure 11:
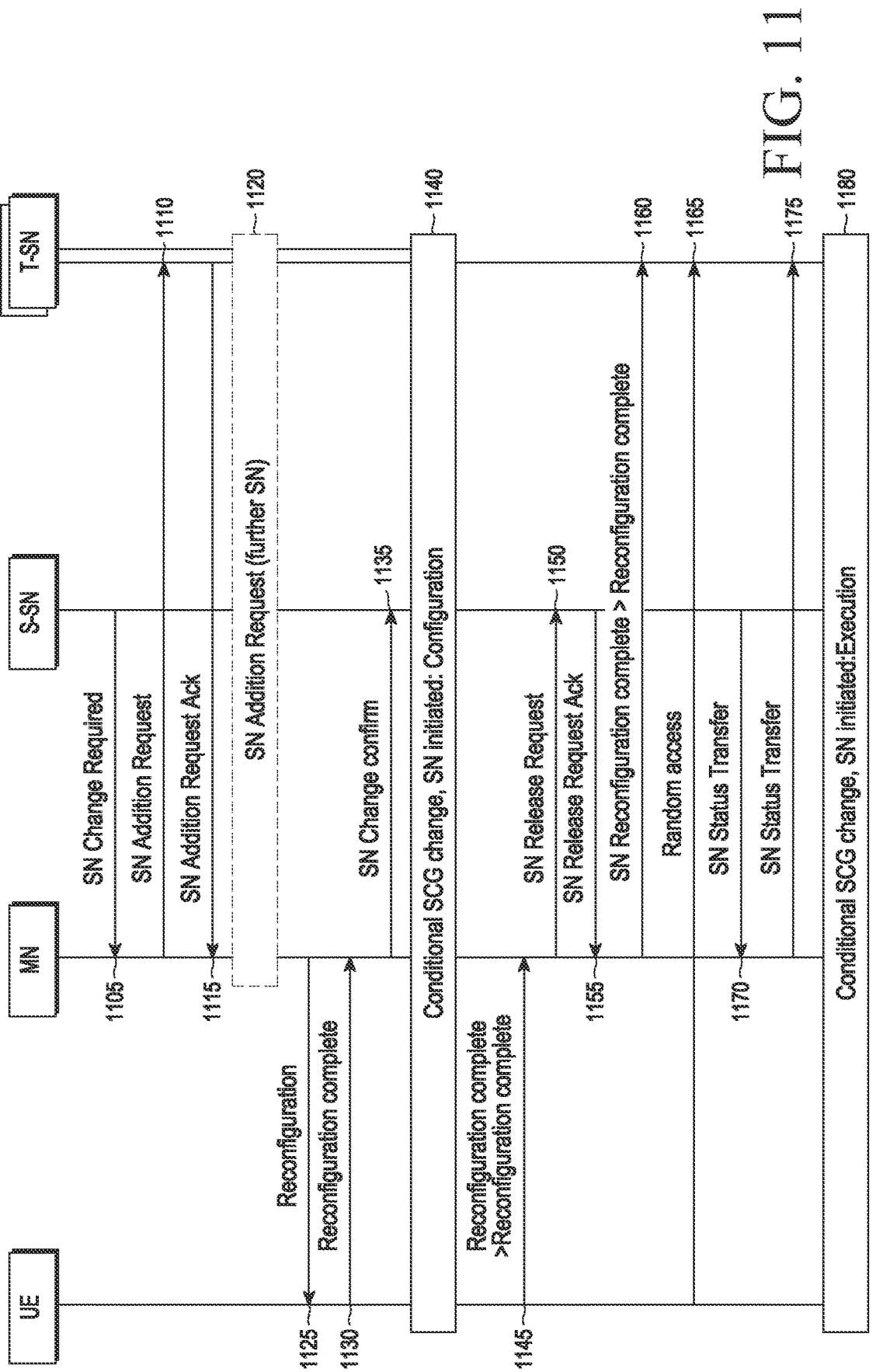
FIG. 11 is a signal flowchart illustrating a procedure of configuring and operating a CPC between SNs according to various embodiments.

FIG. 11 is a signal flowchart illustrating a procedure of configuring and operating a CPC between SNs according to various embodiments.

Referring to FIG. 11, in operation 1105, the S-SN may determine the CPC configuration, determine the T-SN, and transmit an SN change request message (e.g., 'SN change required') to the MN. The SN change request message may include the following information for each candidate cell.

T-SN id: CGI and/or XnAP IE for T-SN

CG-Config including each candidate cell's measurement result

XnAp per candidate field including CPC execution condition as of meas Id, and candidate cell ID like PCI and or CGI RRCReconfiguration including SCG configuration: includes the measurement configuration corresponding to the execution condition of each selected candidate cell.

In operation 1110, the MN may transmit an SN addition request message (e.g., "SNAddRequest") including candidate cell information (e.g., "received candidates") to the T-SN designated by the SN change request message. In operation 1115, the T-SN may perform candidate admission according to the SN addition request message and may transfer configuration information (e.g., 'CPC config') about candidate cells selected through the candidate admission to the MN. In operation 1120, the MN may perform an SN addition request procedure including operations 1110 and 1115 for the additional T-SN.

The MN may generate one piece of conditional reconfiguration information by linking the candidate cells selected for each T-SN with the execution condition received from the SN in operation 1105, and may assign an Id (e.g., 'CondReconfigId') to the generated conditional reconfiguration information. In operation 1125, the MN may transmit an RRC reconfiguration message (e.g., 'RRCReconfiguration') including the conditional reconfiguration information to the UE.

In operation 1130, the UE may transmit an RRC reconfiguration complete message (e.g., 'RRCReconfiguraiton-Complete') responsive to the RRC reconfiguration message to the MN. In operation 1135, the MN transmits an SN change confirmation message to the S-SN, and in operation 1140, a conditional SCG change is made from the S-SN to the T-SN. In the conditional SCG change, the SN may be initialized and conditional reconfiguration information may be applied.

In operation 1145, the UE may transmit an RRC reconfiguration complete message to the MN, and in operation 1150, the MN may transmit an SN release request message (e.g., "SN Release Request") to the S-SN in response to the RRC reconfiguration complete message. In operation 1155, the S-SN may transmit an SN release request acknowledge message (e.g., 'SN Release Request Ack') to the MN. In operation 1160, the MN may transmit an SN reconfiguration complete message to the T-SN. Thereafter, in operation 1165, the UE may perform a random access procedure on the T-SN. In operation 1170, the S-SN may transmit an SN status transfer message (e.g., 'SN Status Transfer') for notifying which packet should be transmitted to the UE or received. In operation 1175, the MN may transmit the SN state transfer message to the T-SN. In operation 1180, the conditional SCG change is complete, and SN initialization may be performed.

In an embodiment, although the RRC reconfiguration message of operation 1125 may include a measurement configuration corresponding to an execution condition for each candidate cell included in the SN addition request message, candidate cells actually selected through candidate admission in each T-SN may be a subset including at least some of candidate cells first given in the S-SN. Accordingly, the UE may unnecessarily perform measurement corresponding to the execution condition for triggering the CPC even for the candidate cell(s) not given as conditional reconfiguration information.

Embodiments for resolving the discrepancy between the measurement configuration by the MN and the actually transmitted conditional reconfiguration information are described with reference to FIGS. 12 and 13.

Figure 12:
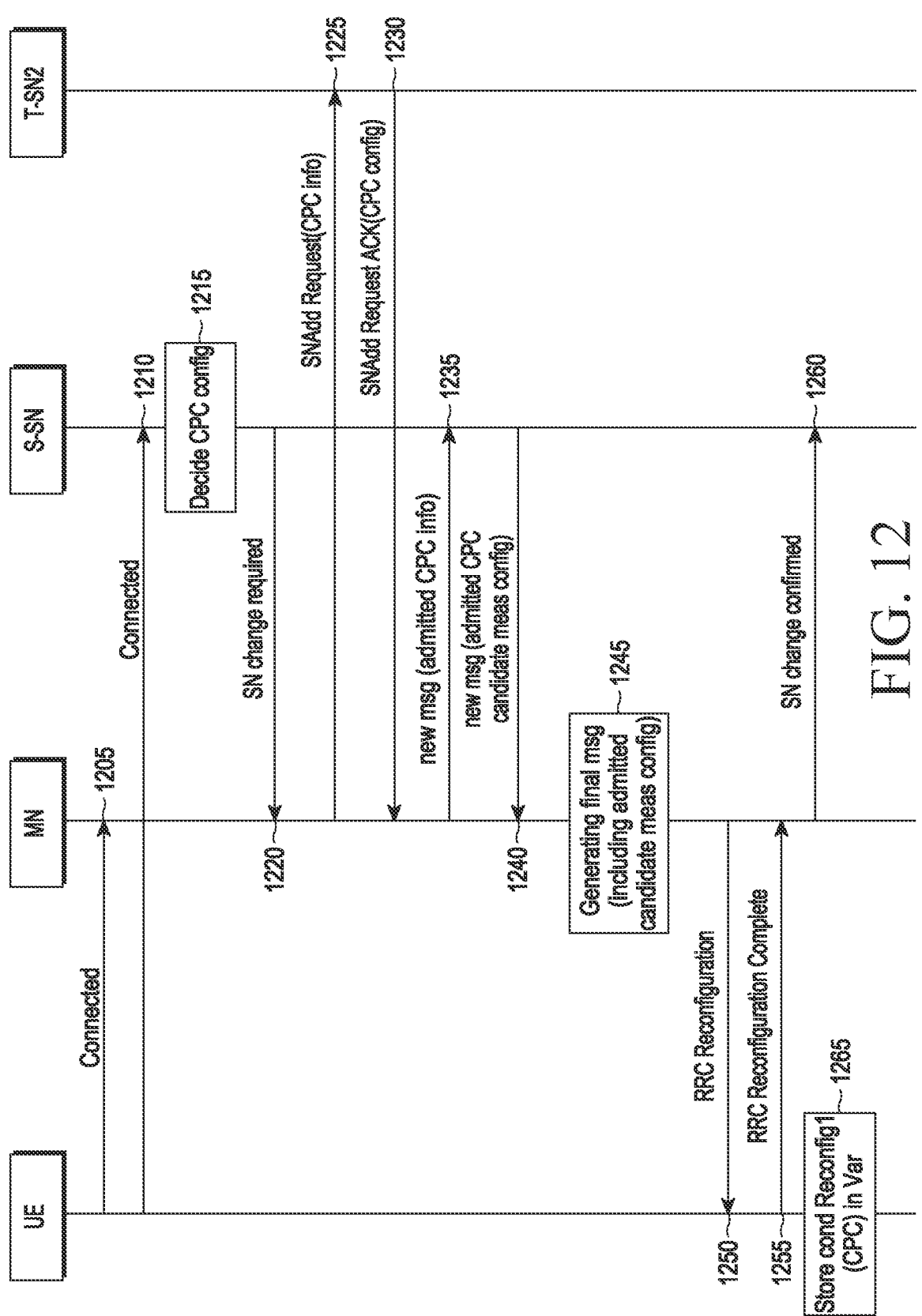
FIG. 12 is a signal flowchart illustrating a procedure of transferring a candidate admission result of a T-SN to an S-SN according to various embodiments.

FIG. 12 is a signal flowchart illustrating a procedure of transferring a candidate admission result of a T-SN to an S-SN according to various embodiments.

Referring to FIG. 12, the UE may establish a connection with the MN in operation 1205 and may establish a connection with the S-SN in operation 1210. In operation 1215, the S-SN may trigger the CPC for the T-SN and determine the CPC configuration. In operation 1220, the S-SN may transfer an SN change request message (e.g., 'SN change required') for the T-SN to the MN. The SN change request message may include the same role and content as in FIG. 10. In an embodiment, the XnAP per candidate field in the SN change request message may further include a field indicating ID for following XnAP msg (for indicating this specific candidate for admission result).

In operation 1225, the MN may transfer an SN addition request message (e.g., "SNAdditionReq") to the T-SN, and in operation 1230, the MN may receive an SN addition request acknowledge message including conditional reconfiguration information (e.g., "CPC config") about candidate-admitted candidate cells from the T-SN.

In operation 1235, the MN may transfer candidate cell information (e.g., 'admitted CPC info') indicating the candidate cells admitted in the T-SN (or additionally in the MN) through an Xn interface message (e.g., a new format message or an SN change confirmed message or an SN modification request (modification Req.) message) transmitted to the S-SN. In an embodiment, the candidate cell information may include IDs of candidate cells that have succeeded in candidate admission from the MN or the T-SN.=>(2) reflecting the standard In an embodiment, to indicate each candidate cell in the message of operation 1235, an ID indicating each candidate cell may be used in the 'per candidate' field included in the SN change request message of operation 1220.

In an embodiment, to refer to each candidate cell in the message of operation 1235, a value indicating the order of "per candidate" fields included in the SN change request message of operation 1220 may be inserted into the "per candidate" field included in the message of operation 1235. Further, an indicator (e.g., 1 bit) indicating whether candidate admission is successful or not may be further included for each 'per candidate' field. The indicator may further indicate whether each candidate cell is admitted by the T-SN or the MN. In an embodiment, the SN change request message may further include at least one or both of an indicator indicating that it has been admitted in the MN for the "per candidate" field and an indicator indicating that it has been admitted in the T-SN.

In operation 1240, the S-SN may identify the finally admitted candidate cells through the message of operation 1235, may include measurement reconfiguration information (e.g., 'measconfig') obtained by removing measurement configurations corresponding to an unnecessary CPC execution condition in the RRC reconfiguration message (e.g., 'RRCReconfiguration'), and may transmit the RRC reconfiguration message to the MN. In an embodiment, the message of the Xn interface transmitted from the S-SN to the MN in operation 1240 may be, e.g., a message of a new format, an RRC transfer message (RRC transfer msg), or an SN modification request message (e.g., 'SN modification required'). The S-SN may include measurement configuration information including the execution condition for each admitted candidate cell in the RRCReconfiguration message, and may carry the RRCReconfiguraiton message on the Xn interface to the MN.

In operation 1250, the MN may include the RRCReconfiguration message including the measurement configuration information received from the S-SN in the 'secondaryCellGroup' field and may transmit the same to the UE. In operation 1255, the UE may transmit an RRCReconfiguraitonComplete message to the MN, and in operation 1260, the MN may transmit an SN change confirmation message (e.g., 'SN change confirmed') to the S-SN. In operation 1265, the UE may perform measurement for the admitted candidate cells, based on the measurement configuration information obtained through the RRCReconfiguration message.

Figure 13:
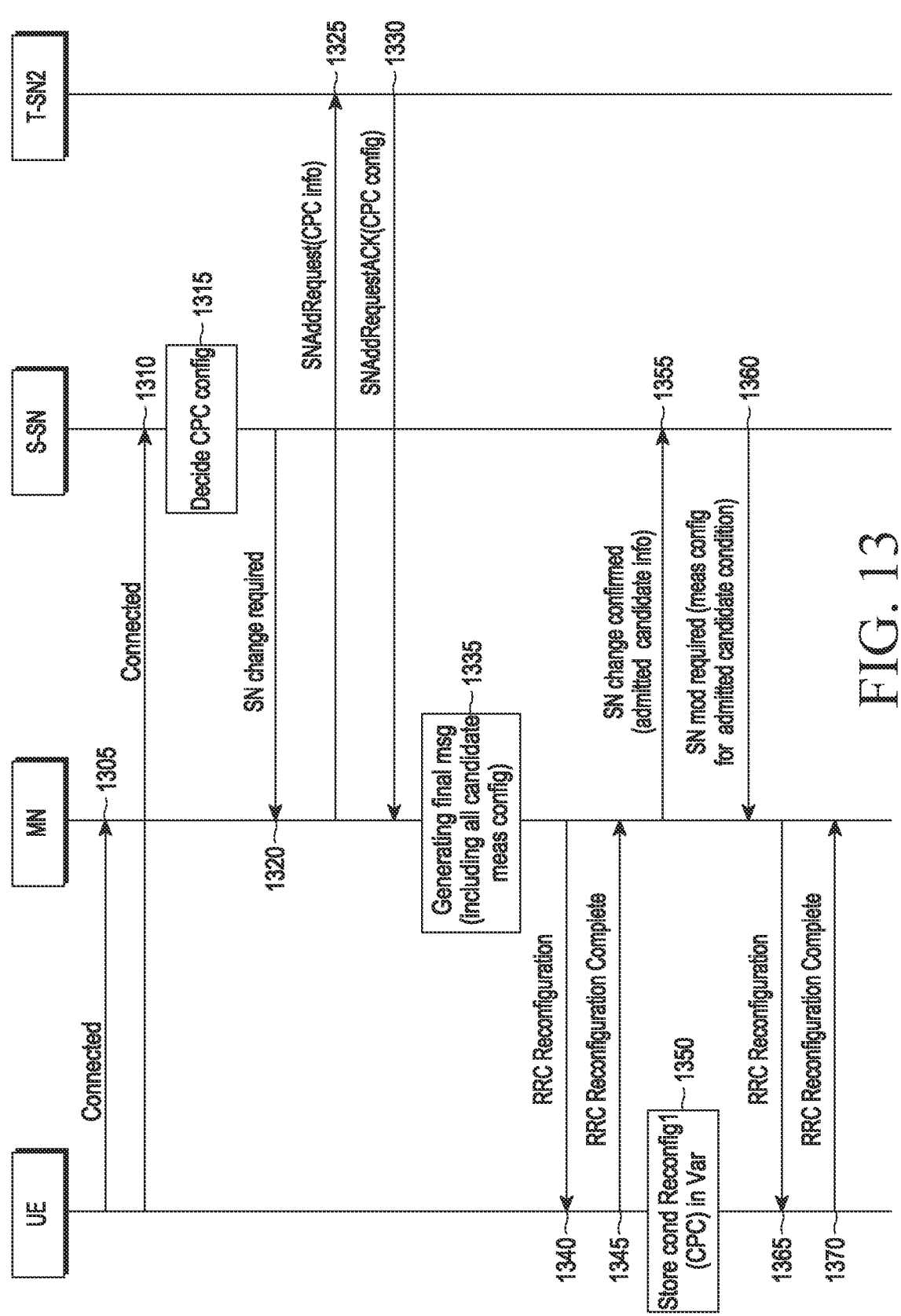
FIG. 13 is a signal flowchart illustrating a procedure of updating measurement configuration information for candidate cells succeeding in admission according to various embodiments.

FIG. 13 is a signal flowchart illustrating a procedure of updating measurement configuration information for candidate cells succeeding in admission according to various embodiments.

Referring to FIG. 13, the UE may establish a connection with the MN in operation 1305 and may establish a connection with the S-SN in operation 1310. In operation 1315, the S-SN may trigger the CPC and determine CPC configuration information for at least one T-SN. In operation 1320, the S-SN may transmit an SN change request message (e.g., 'SN change required') including the CPC configuration information to the MN. In operation 1325, the MN may transmit an SN addition request message (e.g., "SNAddRequest") including CPC information (e.g., "CPC info") indicating conditional reconfiguration information to the T-SN. In operation 1330, the T-SN may transmit an SN addition request acknowledge message (e.g., "SNAddRequestACK") including CPC configuration information (e.g., "CPC config") for candidate-admitted candidate cells to the MN.

In operation 1335, the MN generates measurement configuration information corresponding to the execution condition for all candidate cells included in the SN change request message of operation 1320, and transmits the measurement configuration information to the UE through measconfig in the secondaryCellGroup field included in the RRCReconfiguration message in operation 1340. The UE may transmit an RRCReconfigurationComplete message corresponding to the RRCReconfiguration message to the MN in operation 1345, may store measurement configuration information given through the RRCReconfiguration message in a variable (e.g., 'VarConditionalReconfig') indicating conditional reconfiguration information in operation 1350, and may perform measurement for evaluating an execution condition for all given candidate cells.

After receiving the RRCReconfigurationComplete message from the UE, in operation 1355, the MN may transmit an SN change confirmed message to the S-SN and may transfer information (e.g., 'admitted candidate info') indicating candidate cells successfully admitted by the T-SN or the MN. In this case, to refer to the candidate cells that have succeeded in admission, the MN may include IDs of the candidate cells that have succeeded in admission from the MN or the T-SN in the SN change confirmed message.

In an embodiment, to indicate each candidate cell in the message of operation 1355, an ID indicating each candidate cell may be used in the 'per candidate' field included in the SN change request message of operation 1320.

In an embodiment, to refer to each candidate cell in the message of operation 1335, a value indicating the order of "per candidate" fields included in the SN change request message of operation 1320 may be inserted into the "per candidate" field included in the message of operation 1355. Further, an indicator (e.g., 1 bit) indicating whether candidate admission is successful or not may be further included for each 'per candidate' field. The indicator may further indicate whether each candidate cell is admitted by the T-SN or the MN. In an embodiment, the SN change request message may further include at least one or both of an indicator indicating that it has been admitted in the MN for the "per candidate" field and an indicator indicating that it has been admitted in the T-SN.

Upon receiving the message of operation 1355, in operation 1315, the S-SN may remove measurement configurations for unadmitted candidate cells from among the measurement configuration information for all candidate cells initially configured. In operation 1360, the S-SN may transmit a message (e.g., a message in a new format, an RRC transfer message, or an SN change request message) of the Xn interface to the MN. The message of operation 1360 may carry, to the MN, an RRCReconfiguration message including measurement configuration information including an execution condition for candidate cells admitted by the S-SN. In an embodiment, the message of operation 1360 may include information for removing unnecessary measurement configurations for the trigger condition of the candidate cell that has failed in admission.

In operation 1365, the MN may transmit an RRCReconfiguration message included in the message of operation 1360 received from the S-SN to the UE. In operation 1370, the UE may transmit an RRCReconfigurationComplete message responsive to the RRCReconfiguration message to the MN, and may perform measurement for admitted candidate cells, based on measurement configuration information included in the RRCReconfiguration message.

According to various embodiments, a method for performing a secondary node (SN) change by a master node (MN) of multi-connectivity in a wireless communication system may comprise receiving 930, from a source secondary node (S-SN), an SN change request (SN change required) message including conditional cell change information indicating a maximum number of one or more candidate cells that is serviceable by at least one target secondary node (T-SN), transmitting 935 an SN addition request message to the at least one target secondary node based on the conditional cell change information, receiving 940 an SN addition request acknowledge message including radio resource control (RRC) configuration information from the at least one target secondary node in response to the SN addition request message, and transmitting 950 an RRC reconfiguration message to a user equipment (UE) based on the RRC configuration information.

In an embodiment, the conditional cell change information may include conditional reconfiguration information about at least one candidate cell succeeding in candidate admission in the target secondary node.

In an embodiment, the SN addition request message may include identification information about the one or more candidate cells and a conditional cell change trigger condition.

In an embodiment, the RRC configuration information may include conditional primary secondary cell group (SCG) cell change (conditional PSCell change (CPC)) configuration information about each candidate cell admitted in the target secondary node.

According to various embodiments, a method for performing a secondary node (SN) change by a master node (MN) of multi-connectivity in a wireless communication system may comprise transmitting 1030 and 1040, to at least one target secondary node (T-SN), an SN addition request message including conditional cell change information indicating a maximum number of one or more candidate cells that is serviceable by the at least one target secondary node, receiving 1035 and 1045 an SN addition request acknowledge message including radio resource control (RRC) configuration information from the at least one target secondary node in response to the SN addition request message, and transmitting 1060 an RRC reconfiguration message to a user equipment (UE) based on the RRC configuration information.

In an embodiment, the SN addition request message may include identification information about one or more candidate cells desired to be used by the master node and a conditional cell change trigger condition.

In an embodiment, the RRC configuration information may include conditional primary secondary cell group (SCG) cell change (CPC) configuration information about each candidate cell admitted in the target secondary node.

According to various embodiments, a method for performing a secondary node (SN) change by a master node (MN) of multi-connectivity in a wireless communication system may comprise transmitting 1235, to a source secondary node (S-SN), an SN modification request message including candidate cell information indicating one or more candidate cells admitted by at least one target secondary node (T-SN), receiving 1240, from the source secondary node, measurement configuration information updated based on the candidate cell information, and transmitting 1250 an RRC reconfiguration message including the updated measurement configuration information to a UE.

In an embodiment, the candidate cell information may include conditional primary secondary cell group (SCG) cell change (conditional PSCell change (CPC)) configuration information about the one or more candidate cells.

In an embodiment, the updated measurement configuration information may include a remaining measurement configuration except for at least one measurement configuration selected based on a CPC execution condition from among measurement configuration information about the one or more candidate cells.

According to various embodiments, a device of a master node (MN) performing a secondary node (SN) change of multi-connectivity in a wireless communication system may comprise a transceiver 610 or 620 and a controller 650. The controller may be configured to receive, from a source secondary node (S-SN), an SN change request (SN change required) message including conditional cell change information indicating a maximum number of one or more candidate cells that is serviceable by at least one target secondary node (T-SN), transmit an SN addition request message to the at least one target secondary node based on the conditional cell change information, receive an SN addition request acknowledge message including radio resource control (RRC) configuration information from the at least one target secondary node in response to the SN addition request message, and transmit an RRC reconfiguration message to a user equipment (UE) based on the RRC configuration information.

In an embodiment, the conditional cell change information may include conditional reconfiguration information about at least one candidate cell succeeding in candidate admission in the target secondary node.

In an embodiment, the SN addition request message may include identification information about the one or more candidate cells and a conditional cell change trigger condition.

In an embodiment, the RRC configuration information may include conditional primary secondary cell group (SCG) cell change (conditional PSCell change (CPC)) configuration information about each candidate cell admitted in the target secondary node.

According to various embodiments, a device of a master node (MN) performing a secondary node (SN) change of multi-connectivity in a wireless communication system may comprise a transceiver 610 or 620 and a controller 650. The controller may be configured to transmit, to at least one target secondary node (T-SN), an SN addition request message including conditional cell change information indicating a maximum number of one or more candidate cells that is serviceable by the at least one target secondary node, receive an SN addition request acknowledge message including radio resource control (RRC) configuration information from the at least one target secondary node in response to the SN addition request message, and transmit an RRC reconfiguration message to a user equipment (UE) based on the RRC configuration information.

In an embodiment, the SN addition request message may include identification information about one or more candidate cells desired to be used by the master node and a conditional cell change trigger condition.

In an embodiment, the RRC configuration information may include conditional primary secondary cell group (SCG) cell change (CPC) configuration information about each candidate cell admitted in the target secondary node.

According to various embodiments, a device of a master node (MN) performing a secondary node (SN) change of multi-connectivity in a wireless communication system may comprise a transceiver 610 or 620 and a controller 650. The controller may be configured to transmit, to a source secondary node (S-SN), an SN modification request message including candidate cell information indicating one or more candidate cells admitted by at least one target secondary node (T-SN), receive, from the source secondary node, measurement configuration information updated based on the candidate cell information, and transmit an RRC reconfiguration message including the updated measurement configuration information to a UE.

In an embodiment, the candidate cell information may include conditional primary secondary cell group (SCG) cell change (conditional PSCell change (CPC)) configuration information about the one or more candidate cells.

In an embodiment, the updated measurement configuration information may include a remaining measurement configuration except for at least one measurement configuration selected based on a CPC execution condition from among measurement configuration information about the one or more candidate cells.

The embodiments herein are provided merely for a better understanding of the disclosure, and the disclosure should not be limited thereto or thereby. It is apparent to one of ordinary skill in the art that various changes may be made thereto without departing from the scope of the disclosure.

The embodiments herein are provided merely for a better understanding of the disclosure, and the disclosure should not be limited thereto or thereby. It should be appreciated by one of ordinary skill in the art that various changes in form or detail may be made to the embodiments without departing from the scope of the disclosure defined by the following claims.

The invention claimed is:

1. A method for performing a secondary node (SN) change by a master node (MN) of multi-connectivity in a wireless communication system, the method comprising:
   receiving, from a source SN, an SN change required message including conditional cell change information including a maximum number of at least one candidate cell to be configured on at least one target SN;
   transmitting, to the at least one target SN, an SN addition request message;
   receiving, from the at least one target SN, an SN addition request acknowledge message including a first radio resource control (RRC) message, in response to the SN addition request message;

transmitting, to the source SN, an SN modification request message including candidate cell information indicating at least one candidate cell accepted by the at least one target SN;
   receiving, from the source SN, a second RRC message including updated measurement configuration information; and
   transmitting, to a user equipment (UE), a third RRC message based on the first RRC message, wherein the third RRC message includes the updated measurement configuration information.

2. The method of claim 1, wherein the SN change required message includes conditional reconfiguration information for at least one candidate cell succeeding in candidate admission in the at least one target SN.

3. The method of claim 1, wherein the SN addition request message includes identification information for the at least one candidate cell and a conditional cell change trigger condition.

4. The method of claim 1, wherein the candidate cell information includes conditional primary secondary cell group (SCG) cell change (CPC) configuration information for the at least one candidate cell.

5. The method of claim 1, wherein the updated measurement configuration information includes a remaining measurement configuration except for at least one measurement configuration selected based on a CPC execution condition from among measurement configuration information for the at least one candidate cell.

6. The method of claim 1,
   wherein the SN addition request message includes information related to the maximum number of the at least one candidate cell, and
   wherein the first RRC message includes at least one secondary cell group configuration for each secondary cell configured on the at least one target SN, and
   wherein each secondary cell is configured based on the maximum number of the at least one candidate cell.

7. The method of claim 1, wherein the SN addition request message includes the conditional cell change information including the maximum number of the at least one candidate cell to be configured on the at least one target SN.

8. A master node (MN) performing a secondary node (SN) change of multi-connectivity in a wireless communication system, comprising:
   a transceiver; and
   a controller, wherein the controller is configured to:
      receive, from a source SN, an SN change required message including conditional cell change information including a maximum number of at least one candidate cell to be configured on at least one target SN;
      transmit, to the at least one target SN, an SN addition request message;
      receive, from the at least one target SN, an SN addition request acknowledge message including a first radio resource control (RRC) message in response to the SN addition request message;
      transmit, to the source SN, an SN modification request message including candidate cell information indicating at least one candidate cell accepted by the at least one target SN;
      receive, from the source SN, a second RRC message including updated measurement configuration information; and
      transmit, to a user equipment (UE), a third RRC message based on the first RRC message, wherein the third RRC message includes the updated measurement configuration information.

9. The MN of claim 8, wherein the SN change required message includes conditional reconfiguration information for at least one candidate cell succeeding in candidate admission in the at least one target SN.

10. The MN of claim 8, wherein the SN addition request message includes identification information for the at least one candidate cell and a conditional cell change trigger condition.

11. The MN of claim 8, wherein the candidate cell information includes conditional primary secondary cell group (SCG) cell change (CPC) configuration information for the at least one candidate cell.

12. The MN of claim 8, wherein the SN addition request message includes information related to the maximum number of the at least one candidate cell, and wherein the first RRC message includes at least one secondary cell group configuration for each secondary cell configured on the at least one target SN, and wherein each secondary cell is configured based on the maximum number of the at least one candidate cell.

13. The MN of claim 8, wherein the SN addition request message includes the conditional cell change information including the maximum number of the at least one candidate cell to be configured on the at least one target SN.

14. The MN of claim 8, wherein the updated measurement configuration information includes a remaining measurement configuration except for at least one measurement configuration selected based on a CPC execution condition from among measurement configuration information for the at least one candidate cell.

* * * * *